United States Patent [19]

Calle et al.

[11] 4,084,234

[45] Apr. 11, 1978

[54] CACHE WRITE CAPACITY

[75] Inventors: Jaime Calle, Glendale; Lawrence W. Chelberg, Phoenix, both of Ariz.

[73] Assignee: Honeywell Information Systems Inc., Waltham, Mass.

[21] Appl. No.: 769,617

[22] Filed: Feb. 17, 1977

[51] Int. Cl.² ............................................. G06F 13/06
[52] U.S. Cl. .................................................... 364/200
[56] References Cited

U.S. PATENT DOCUMENTS

| | | | |
|---|---|---|---|
| 3,588,829 | 6/1971 | Boland et al. | 364/200 |
| 3,588,839 | 6/1971 | Belady et al. | 364/200 |
| 3,806,888 | 4/1974 | Brickman et al. | 364/200 |
| 3,820,078 | 6/1974 | Curley et al. | 364/200 |
| 3,896,419 | 7/1975 | Lange et al. | 364/200 |
| 3,911,401 | 10/1975 | Lee | 364/200 |

*Primary Examiner*—Gareth D. Shaw
*Assistant Examiner*—Thomas M. Heckler

*Attorney, Agent, or Firm*—Faith F. Driscoll; Nicholas Prasinos; Ronald T. Reiling

[57] ABSTRACT

An input/output system includes a local memory module including a cache store and a backing store. The system includes a plurality of command modules and a system interface unit having a plurality of ports, each connected to a different one of the command modules and to the local memory module. The cache store provides fast access to blocks of information previously fetched from the backing store in response to memory commands generated by any one of a plurality of command modules during both data transfer and data processing operations. The local memory module includes apparatus operative in response to each memory command to enable the command module to write into cache store the data which is requested to be written into backing store when it is established that such data has been previously stored in cache store.

27 Claims, 13 Drawing Figures

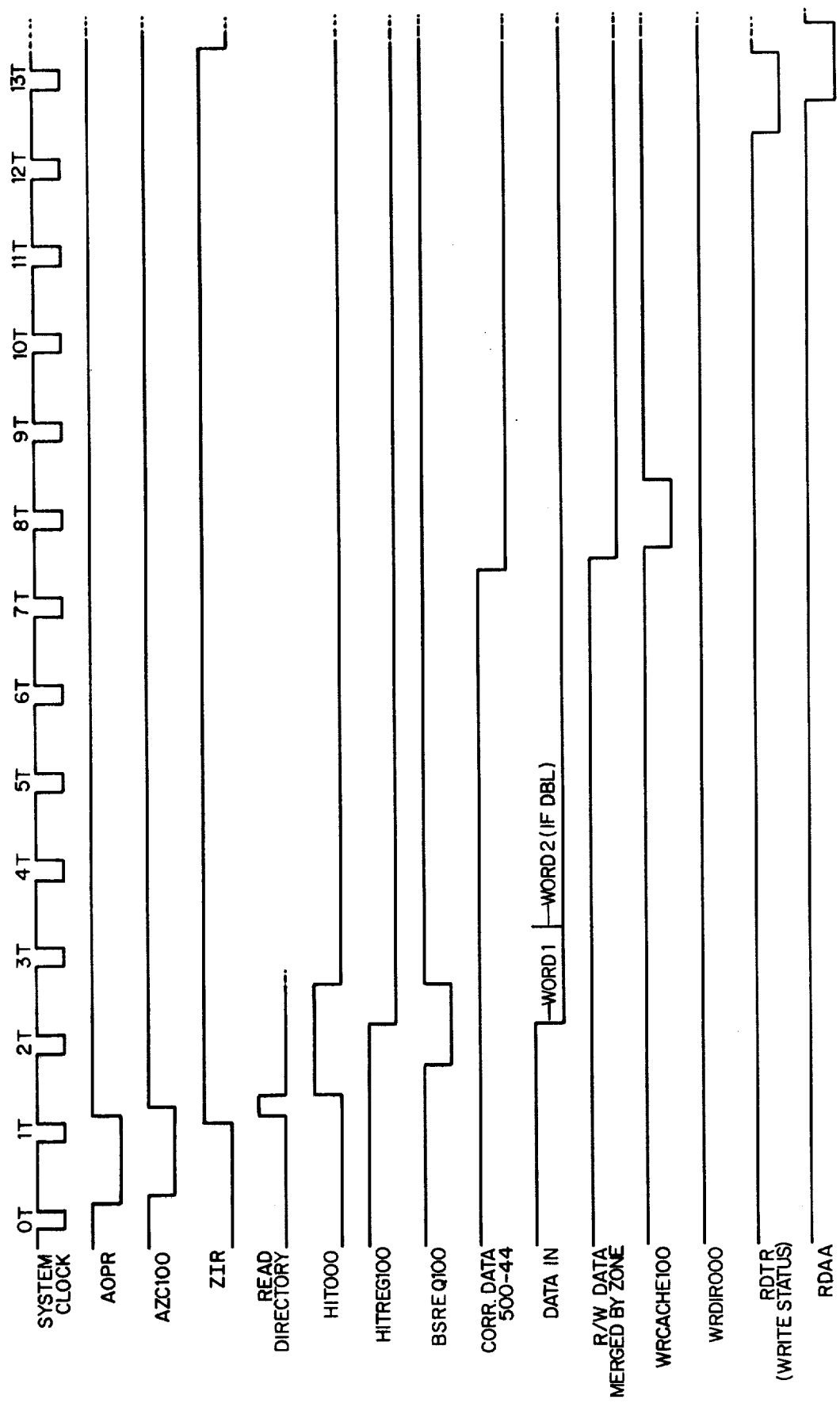

CACHE WRITE CAPACITY

RELATED APPLICATIONS

1. "Input/Output Cache System Including Bypass Capability" invented by Jaime Calle and Lawrence W. Chelberg, Ser. No. 755,871, filed on Dec. 30, 1976 and assigned to the same assignee as named herein.
2. "Memory Access System" invented by Edward F. Weller, III and Marion G. Porter, Ser. No. 742,814, filed on Nov. 18, 1976 and assigned to the same assignee as named herein.

BACKGROUND OF THE INVENTION

1. Field of Use

The present invention relates to data processing systems and in particular to systems which include cache memory stores.

2. Prior Art

In general, cache memory systems are required to provide the most recently updated version of the information being requested. In order to ensure that this is done, some prior art arrangements have the central processing unit associated therewith perform the necessary cache updating operations when a portion of the information being written into backing store is changed. Normally, this is done by setting an invalidity indication in the cache store directory for signalling when the directory indicates that the information being updated in backing store is also stored in cache. Thereafter, the central processing unit is required to "flush" obsolete information from the cache store so that it does not appear in cache store the next time the information specified by the directory address is accessed.

The above arrangements have been found to be quite time consuming particularly where such information is being altered by a number of sources or units. Also, such arrangements require additional circuits for performing the type of operations metioned.

Accordingly, it is a primary object of the present invention to provide an improved arrangement for updating information stored in cache store.

It is a further object of the present invention to provide a cache store which can be updated by any one of a number of sources or command modules.

SUMMARY OF THE INVENTION

The above and other objects are achieved in a preferred embodiment of the present invention which comprises an input/output system which includes a number of command modules and a local memory module. The local memory module includes a backing store and a cache store. The cache store provides fast access to blocks of information previously fetched from the backing store. The system of the preferred embodiment further includes a system interface unit which includes a plurality of ports, each connected to a different one of the modules.

The local memory module further includes control apparatus which is operative in response to each write memory command to enable the information supplied by a command module being requested for writing into the backing store to be written into the cache store when means included within the control apparatus determines that the information previously had been written into cache store. In accordance with the preferred embodiment, means are provided for merging the input data specified by a write command to be written into backing store with the data read out from backing store and applying the result as inputs to both cache store and backing store. This ensures that exactly the same data is written into cache store as that written into backing store.

In the preferred embodiment, the command modules include at least one input/output processor and a multiplexer module and the means corresponds to the circuits of a directory storage unit associated with the cache store which is operative to detect when the address of the information being written into backing store matches a directory address indicating that the information is stored in the cache store. The means for merging corresponds to a multi-input data selector switch having inputs connected to receive the new data from the system interface unit and old output data from backing store. The selector switch has outputs which apply the resulting merged data to the cache store and backing store for writing therein. This arrangement minimizes the number of data paths and amount of merging circuits.

By having information accompanying each memory write command which represents changes in information previously stored in cache store, automatically written into cache store, this eliminates the need to perform time consuming flushing operations and minimizes the complexity of the memory system. Additionally, the arrangement facilitates fast access to information presented by the command modules (i.e., improves "hit" ratio).

BRIEF DESCRIPTION OF THE DRAWINGS

FIG. 9 is a timing diagram used in explaining the operation of the present invention.

DESCRIPTION OF THE PREFERRED EMBODIMENT

General Description

Figure 1:
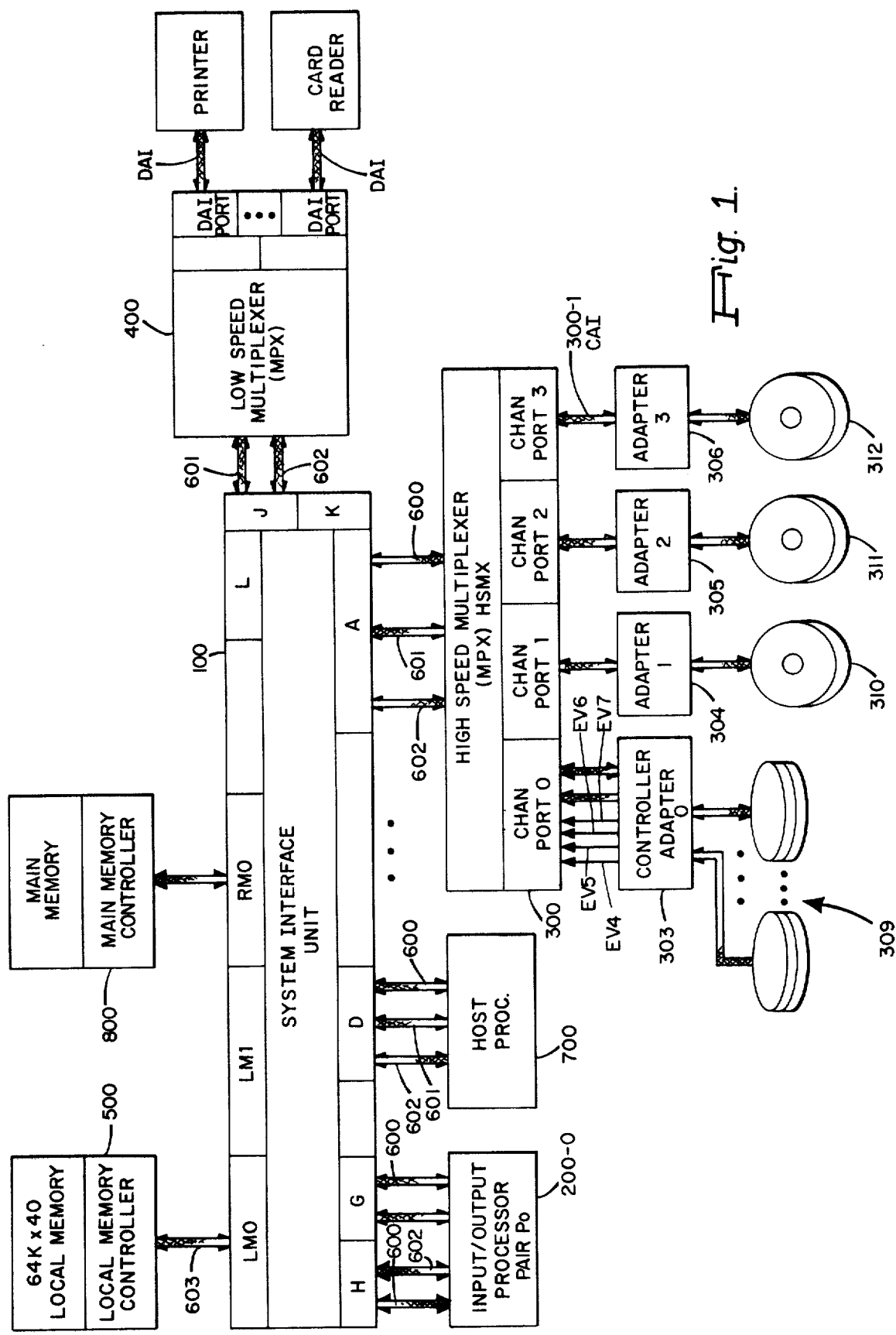
FIG. 1 illustrates in block diagram form an input/output system employing the principles of the present invention.

As seen from FIG. 1, the system which incorporates the principles of the present invention includes at least one input/output processor pair (PO) 200-0, a system interface unit (SIU) 100, a high speed multiplexer (HSMX) 300, a low speed multiplexer (LSMX) 400, a host processor 700 and a number of memory modules corresponding to a local memory module 500 and main memory module 800. Different ones of these modules connect to one of a number of ports of the system interface unit 100 through a plurality of lines of different ones of different types of interfaces 600 through 603. More specifically, the input/output processor 200, the host processor 700 and high speed multiplexer 300 connect to ports G, E and A respectively while the low speed multiplexer 400 and memory modules 500, 500a and 800 connect to ports J, LMO and RMO respectively.

The input/output system of FIG. 1 can be viewed as including a number of "active modules", "passive modules" and "memory modules". The IOP processor 200, host processor 700 and high speed multiplexer 300 serve as active modules in that each have the ability to issue commands. The active modules normally connect to ports A through H. A plurality of passive modules are connected to three ports J, K and L. These modules correspond to the low speed multiplexer 400 and the system interface unit 100 and are units capable of interpreting and executing commands applied to the lines of interface 601 as described herein. The last group of modules constitute local memory modules and remote memory modules such as those of the main system which are capable of executing two different types of commands applied to the lines of interface 603.

The input/output system of FIG. 1 normally functions as an input/output subsystem responsive to input/output instructions issued by host processor 700 which normally connects to port F via the interfaces 600 and 601 which correspond to a data interface and a programmable interface respectively described in greater detail herein. Ports F and E include interfaces for enabling connection of either multiplexer or processor modules of FIG. 1.

For the purpose of the present invention, processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100 and directly controls unit record peripheral devices coupled to low speed multiplexer 400. The processor 200 connects to port H via the data interface 600 and interrupt interface 602.

The low speed multiplexer 400 which for the purposes of the present invention can be considered conventional in design, provides for attachment of low speed peripheral devices via peripheral adapters, each of which couple to the lines of a device adapter interface (DAI). The interface and adapter may take the form of those units described in U.S. Pat. No. 3,742,457 which is assigned to the assignee of the present invention. The low speed devices include card readers, card punches and printers. As seen from FIG. 1, the multiplexer 400 connects to port J via the programmable interface 601.

The high speed multiplexer 300 directly controls transfers between the groups of disk devices and tape devices 309 through 312 which connect to different ones of the channel adapters 302 to 305. Each of the channel controller adapters 303 through 306 which can to a maximum of 16 devices, in turn connects to a different one of the ports or channels 0 through 3 via the interface lines of a channel adapter interface (CAI) 301-1. The high speed multiplexer 300 connects to port A corresponding to a data interface 600, a programmable interface 601 and an interrupt interface 602.

For purposes of the present invention, each of the channel controller adapters 302 through 305 may be considered conventional in design and take the form of controller adapters described in the aforementioned U.S. Pat. No. 3,742,457.

As mentioned previously, each of the modules connect to different ports of the system interface unit 100. The unit 100 controls the connection of the different modules to each other via transfer paths enabling the transfer of data and control information between pairs of modules. For the purposes of the present invention, the system interface unit 100 can be viewed as a switching network enabling each of the "active" modules to transfer data to and from local memory module 500 when the requesting module has the highest priority and is granted the next available memory cycle. That is, as explained herein, the unit 100 includes priority logic circuits which determine the relative priority of requests from each of the active modules and grants the next available memory cycle to the highest priority request received.

Additionally, the unit 100 includes interrupt priority logic circuits which determine the relative priority of interrupt requests received from each of the modules and selects the highest priority request received and passes the request to processor 200 via a switching network as explained herein.

The Port Interfaces

Before describing in greater different one of the modules of FIG. 1, each of the interfaces 600 through 603 referred to previously will now be described with reference to FIGS. 5a through 5d.

Referring first to FIG. 5a, it is seen that this figure discloses the lines which constitute the data interface which is one of the interfaces which provides for exchange of information between an active module and the system interface unit 100. Exchange is accomplished by controlling the logical states of various signal lines in accordance with pre-established rules implemented through a sequence of signals termed "a dialog".

As seen from FIG. 5a, the interface includes an active output port request line (AOPR), a plurality of data to SIU lines (DTS 00-DTS 35, PO-P3), a plurality of steering data to SIU lines (SDTS 0-6, P), a plurality of multiport identified to SIU lines (MITS 0-3, P), an active request accepted line (ARA), an accept read data line (ARDA), a plurality of data from SIU bus lines (DFS 00-35, PO-P3), a plurality of multiport identifier from SIU lines (MIFS 0-3, P), a double precision from SIU line (DPFS), and an accept status line (AST). The description of the interface lines are given in greater detail in the section to follow.

| DATA INTERFACE LINES | |
|---|---|
| Designation | Description |
| AOPR | The active output port request line is an unidirectional line which extends from each of the active modules to the SIU 100. When set, this line signals the SIU that the module request a transfer path over which a command or data are to be transmitted. |
| DTS 00-35, PO-P3 | The data path lines are a four byte wide undirectional path (four 10 bit bytes) that extends between each of the active modules and the SIU and are used for transferring commands or data from each active module to the SIU 100. |
| SDTS 0-6, P | The steering data to SIU lines extend from each active module to the SIU 100. These lines are used to apply steering control information to the SIU 100 when the line AOPR is set. Steering control information consists of seven bits and a parity bit which are coded as follows: <br>(a) The state of bit 0 - The type of command applied to the DTS lines (whether the command is a programmable interface command or a memory command). |

DATA INTERFACE LINES

| Designation | Description |
|---|---|
| | (b) Bits 1–4 are coded to indicate which one of the modules are to receive and interpret the command (commands are interpreted only by memory modules and programmable interface commands shall be interpreted by all modules except input/output processor 200). |
| | (c) The state of bit 5 indicates whether one or two words of the command information is to be transferred between the requesting active module and the designated receiving module (one word specifies a single precision transfer and two words specifies a double precision transfer). |
| | (d) The state of bit 6 indicates the direction of transfer between the requesting module and the designated receiver module. |
| | (e) Bit P is a parity bit generated by the requesting active module which is checked by apparatus included within the SIU 100. |
| MITS 0-3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00-35, PO-P3 | The data from SIU lines are another set of data path lines which are a four byte wide unidirectional path (four 10 bit bytes) which extends from the SIU to each active module. These set of lines are used by the SIU 100 to convey read type data to a designated one of the active modules. |
| MIFS 0-3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA signals the active module that it should accept status information applied to the DFS lines. |

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed "dialog". The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

PROGRAMMABLE INTERFACE LINES

| Designation | Description |
|---|---|
| APC | The accept programmable interface command line extends from the SIU 100 to each receiving module. When set, this line signals the module that command information has been applied to the PDFS lines of the interface by the SIU and is to be accepted by the module. |
| PDFS 00-35, P0-P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00-35, P0-P3 | The programmable interface data to the SIU lines are a four byte wide undirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1) and a plurality of interrupt multiport identifier lines (IMID 00-03) for modules connected to ports A through L. For modules connected to ports G and H, the interrupt interface further includes to a level zero present line (LZP), a higher level interrupt present line (HLIP), an interrupt data request line (IDR), a release line (RLS) and a plurality of active interrupt level lines (AIL0-2). As seen from FIG. 5c, the interrupt interface ports G and H do not include an interrupt multiport identifier line. The description of the interrupt interface lines are given in greater detail herein.

INTERRUPT INTERFACE LINES

| Designation | Description |
|---|---|
| IR | The interrupt request line extends from each module to the SIU 100. When set, this line indicates to the SIU that it requires service. |
| IDA 0-3, P0, IDA 4-11, P1 | The interrupt data lines extend from an active module to the SIU 100. These lines are coded to contain control information required to be transferred to the input/output processor when an interrupt request has been accepted by the processor. These bits are coded as follows:<br>(a) The state of bit 0 specifies to the SIU 100 which os the two processors |

-continued

INTERRUPT INTERFACE LINES

| Designation | Description |
|---|---|
| | (i.e. processor number) is to process the interrupt request. |
| | (b) Bits 1-3 are coded to indicate the priority or level number of the interrupt request to the SIU 100. |
| | (c) Bit P0 is a parity bit for bits 0-3. |
| | (d) Bits 4-8 are coded to provide a portion of an address required to be generated by the input/output processor 200 for referencing the correct procedure for processing the interrupt (i.e. an interrupt control block number ICBN). |
| | (e) Bit P1 is a parity bit for bits 4-11. |
| IMID 00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0-2 | The active interrupt level lines extend from the SIU to the input/output processor 200. These lines are coded to designate the interrupt level number of the procedure being executed by the processor 200. |

A last set of interface lines utilized by certain ones of the modules of FIG. 1 coresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept PI command line (APC), an accept ZAC command line (AZC), a PI interface ready line (PIR), a ZAC interface ready line (ZIR), a read data transfer request line (RDTR), a plurality of data from memory lines (DFM 00-35, P0-P3, a plurality of request identifier from memory lines (RIFM 0-7, P0-P1), a double precision from memory line (DPFM), a QUAD line, a read data accepted line (RDAA) and a system clock line (SYSCLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

LOCAL MEMORY INTERFACE LINES

| Designation | Description |
|---|---|
| DTM 00-35, P0-P3 | The data path lines constitute a four byte wide unidirectional path (36 information lines and four odd parity lines) that extends from the SIU 100 to the local memory 500. These lines are used to transfer memory or programmable interface commands to the local memory 500. |
| RITM 0-3, P0 RITM 4-7, P1 | The requestor identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows. |
| | (a) Bits 0-1 are port number selection bits coded to specify which port or subchannel within the attached module is to receive or interpret the memory command sent to the module. |
| | (b) Bit 2 is a read/write to memory bit which is included in the steering control information received from the active module which is forwarded by the SIU to the local memory 500 when a new command is sent to the memory by the SIU 100. The state of this bit indicates the direction of data transfer. |
| | (c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module 500. When set, this line signals the local memory module 500 to accept the ZAC command and control information applied to the other lines by the SIU 100. The setting of this interface line is mutually exclusive with the accept PI command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an active module via the SIU 100. |
| RIEM 0-3, P0, RIFM 4-7, P1 | The two groups of requestor identifier from memory lines extend from the local memory module 500 to the SIU 100. These lines are coded for directing the read data back from module 500 back to the requesting module. |
| DPFM and QUAD | The double precision from memory line and QUAD line extend from the local memory module 500 to the SIU 100. These lines are coded to indicate the number of words to be transferred via the SIU 100 to the requesting module during read data transfer request time interval. These lines are coded as follows |

-continued

LOCAL MEMORY INTERFACE LINES

| Designation | Description |
|---|---|
| | QUAD DPFM<br>0　　0　　one word single precision<br>0　　1　　two words, double precision<br>1　　X<br>　　(don't care)　　four words |
| DSD | The read data/status identifier line extends from the local memory module 500 to the SIU. The state of this line signals the SIU 100 whether the information applied to the lines DFM is read data or status information when line RDTR is set. When set, the line indicates status information of one or two words (QUAD= 0) is being transferred. When reset to a binary ZERO, the line signals that up to four words of data are being transferred, the number being specified by the coding of lines QUAD and DPFM. |
| RDAA | The read data accepted line as mentioned in connection with the programmable terminal extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor 200 to synchronize the operations of each memory module from a common system clock source. |

While FIGS. 5a through 5d show the lines which connect the different modules of the system of FIG. 1 to the SIU 100, it will be appreciated that other lines are also included for signaling other conditions as for example error conditions and operational conditions. Having described the different types of interfaces utilized by the modules of FIG. 1, each of the modules pertinent to the understanding of the present invention will now be described in greater detail.

Detailed Description of Input/Output Processor Pair 200-0

Figure 2:
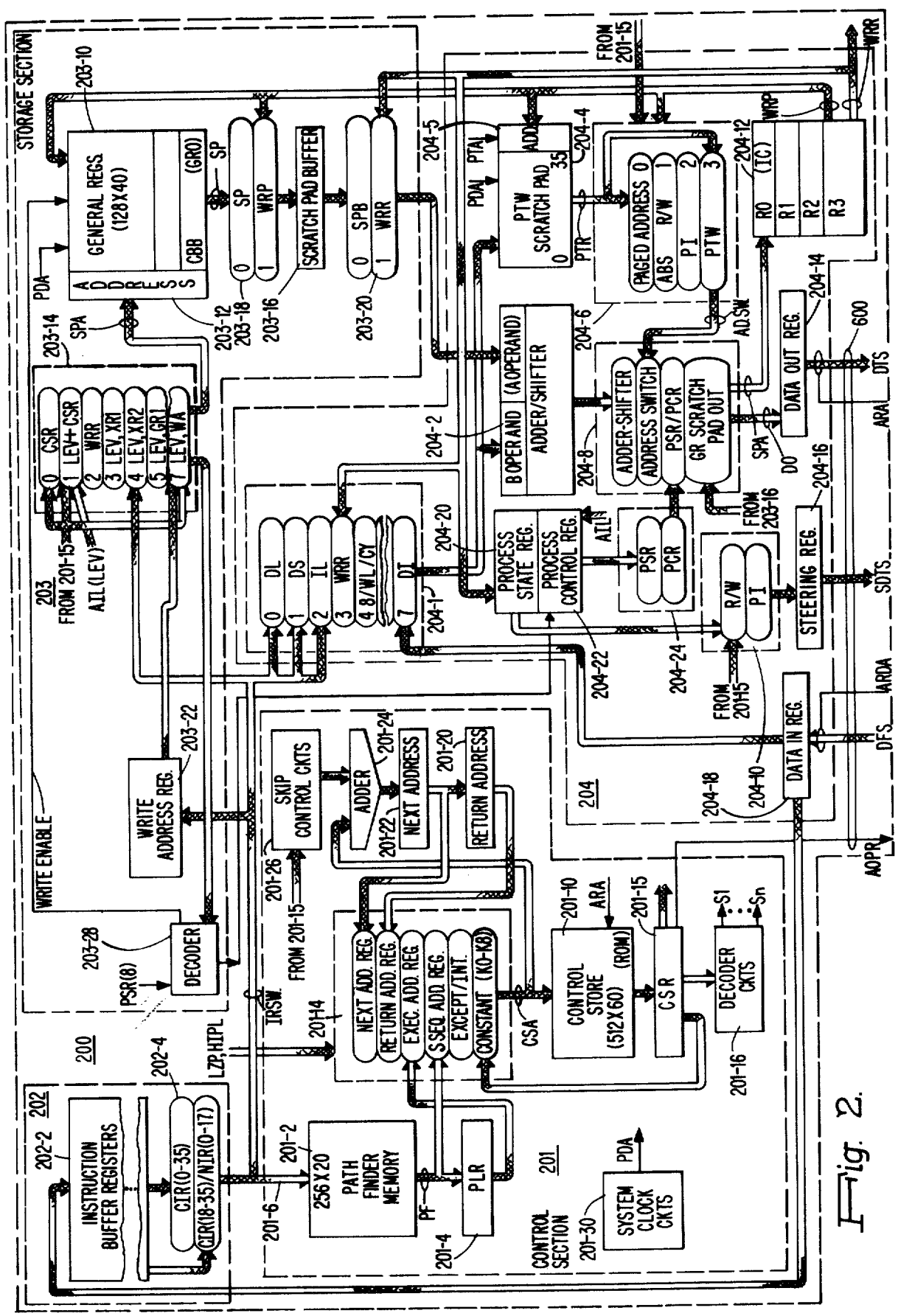
FIG. 2 shows in greater detail the input/out processing unit of FIG. 1.

Referring to FIG. 2, it is seen that each processor 200 of pair PO comprises a microprogrammed control section 201 operative to generate control signals in response to microinstructions stored in a control store 201-10 for executing instructions, an instruction buffer section 202 for storing instructions fetched from the local memory module 500, a storage section 203 and a processing section 204 for performing arithmetic and logic operations under the control of microprograms stored in control store 201-10. The processor pair arrangement ensures system reliability and is discussed in detail in the first referenced application.

Control Store Section 201

Considering each section in greater detail, the control store 201-10 is constructed of fixed sections which use for example a read only (ROM). The store 201-10 is addressable via signals from any one of the eight address sources applied to a selector switch 201-14. The contents of the addressed locations are read out into an output register 201-15 and decoded by decoder circuits included within a block 201-16.

Additionally, as shown, signals from one of the fields of the microinstruction contents of register 201-15 are applied as an input to the switch 201-14 for selecting which one of the eight input sources is to apply an address to control store 201-10. The microinstructions read out to register 201-15 include address constants for branching the control store 201-10 to appropriate microprogram routines.

As seen from FIG. 2, the eight control store address sources include: interrupt/exception signals derived from signals applied by the system interface unit 100 and circuits included within processor 200; a next address register position which receives next address information stored in a register 201-22 via an adder circuit 201-24; a return address register position which receives the return address contents of a return register 201-20; an execution address register position which receives an address from a pathfinder memory 201-2 via memory output register 201-4; a sequence address register position which also receives an address from register 201-4; and a constant position which receives a constant value from the output register 201-15.

The appropriate next address is generated by adder circuit 201-24 which receives as one operand input, address signals from one of the sources selected by switch 201-14 and as other operand input, signals from skip control circuits of a block 201-26. The skip control circuits are conditioned by constant signals stored in control store register 201-15 which in turn provide an appropriate value as one of the operand inputs to the adder 201-24. The resultant address generated by adder circuit 201-24 represents the sum of the addresses applied by switch 201-14 and constant signals provided by skip control circuits of block 201-26. Briefly, the different positions of switch 201-14 are selected in response to microinstructions read from control store 201-10 to provide appropriate addresses for microprograms stored in control store 201-10 required for the execution of an operation specified by the op code of a program instruction. The instruction op code is applied to the pathfinder memory 201-2 via path 201-6 as shown. The return address register position of switch 201-14 is selected during program sequencing as a consequence of a branch operation while the constant register position is selected to provide for a branch to a predetermined location in the control store 201-10 defined by the constant field of the microinstruction stored in register 201-15.

Interrupts are processed at the completion of execution of a program instruction. It is seen in FIG. 2 that a higher level interrupt present (HLIP) and level zero interrupt (LZP) lines apply signals to switch 201-14. The signal applied to the HLIP line is "ANDed" with interrupt inhibit signals from a process control register 204-22 and the result is ORed with the signal applied to the LZP line. When the higher level interrupt present signal is not inhibited or there is a signal applied to the LZP line, signals from circuits, not shown, connected to switch 201-14 select the exception/interrupt position. The signal lines indicative of the presence of an interrupt (LZP and HIPL) cause the selection of an interrupt sequence of microinstructions to be referenced in lieu of referencing the microinstruction sequence for executing the next program instruction.

Signal lines indicative of "exceptions" are applied to control circuits, not shown, associated with switch 201-14 and cause the selection of the exception/interrupt position. This provides an address for referencing an exception sequence of microinstructions. Depending upon the type of execution, the exception may be processed immediately because continuing program instruction execution must be prevented or it is not possible (e.g. faults, illegal instructions). The exception is processed upon the completion of execution of the program instruction where the condition does not require immediate attention (e.g. time out, overflow, etc.). As explained herein, the occurrence of exceptions cause the exception/interrupt position of 201-14 to be selected and the setting of an appropriate bit position in process control register 204-22.

Timing signals, designated as PDA in FIG. 1, required for establishing appropriate memory cycles of operation for control section 201 as well as timing signals for operating other sections of processor 200 and the other modules of the system of FIG. 1 are provided by clock circuits included within a block 201-30. For the purpose of the present invention, the clock circuits as well as the other circuits of FIG. 2 can be considered conventional in design and can for example take the form of circuits disclosed in the publication titled "The Integrated Circuits Catalog for Design Engineers" by Texas Instruments Inc., printed 1972. More specifically, the clock circuits can comprise a crystal controlled oscillator and counter circuits while the switch 201-14 can comprise a plurality of data selector/multiplexer circuits.

From the above, it is seen that as in most microprogrammed control machines, the control store 201-10 provides the necessary control for each processor cycle of operation. That is, each microinstruction word read out from control store 201-10 during a cycle of operation is divided into a number of separate control fields which provide the necessary input signals to the various selector switches of FIG. 2 for addressing of the different scratch pad memories and selection of operands, signals for specifying various test conditions for branching, signals for controlling the operation of an adder/shifter unit of section 204 and signals for providing control information necessary for generating commands. For more detailed information regarding the operation of control section 201, reference may be made to U.S. Pat. No. 4,001,788 titled "Pathfinder Microprogram Control System" invented by G. Wesley Patterson, et al which is assigned to the assignee of the present invention. Reference may also be made to the documents referenced in the introductory portion of the specification.

Instruction Buffer Section 202

This section includes a plurality of registers 202-2 for storing up to four words of instructions fetched from local memory module 500 and applied via a data in register 204-18. The group of registers 202-2 are connected to a two position instruction register switch 202-4 which is arranged to provide two outputs, a current instruction read output (CIR) and a next instruction read output (NIR). The selection of instruction words on a half or full word basis is made in accordance with the states of bit positions of the current instruction counter (IC) normally stored in a first of the working registers of block 204-12. For the purpose of the present invention, the arrangement can be considered conventional in design.

Storage Section 203

As seen from FIG. 2, this section comprises a scratch pad memory containing eight sets or groups of registers associated with eight different processes each assigned a different one of eight priority levels. The highest priority level is level 0 and the lowest priority level is level 7. Each group or level includes 16 registers used as described herein.

The scratch pad memory 203-10 is addressed via an eight position data selector switch 203-14 which selectively applies a seven bit address from any one of eight sources to address inputs 203-12. The three most significant bit positions of address inputs 203-12 select one of the eight sets of registers (i.e. the level) while the remaining four bits select one of the 16 registers. Signals applied to the active interrupt level (AIL) lines by the SIU 100 provide the three most significant bits to the scratch pad address inputs 203-12. The remaining signals are provided by control store register 201-15 or fields from the instruction applied via the IRSW.

The write address register 203-22 is loaded via switch 202-4 to store signals corresponding to either bits 9-12 or bits 14-17 of the current program instruction as designated by one of the fields of the microinstruction contained in register 201-15. Accordingly, the write address register provides address storage for loading or returning a result to one of the general registers of scratch pad memory 203-10. The write operation occurs upon the generation of a write clock signal which occurs either in response to switching to a binary ONE a clocked write flip-flop not shown, or in response to a field of a microinstruction loaded into register 201-15. When generated by the write flip-flop, the write clock signal occurs when the write flip-flop is reset to a binary ZERO upon the occurrence of a next PDA clock pulse. This allows a write operation relating to a program instruction to occur during the start of processing the next instruction.

It will be noted that the contents of the write address register 203-22 are applied to a decoder network 203-28 via selector switch 203-14 which is operative to generate a signal on an output line each time register 203-22 stores an address of 0, 1 or 15. This signal inhibits the generation of a write clock pulse by gating circuits, not shown, when write flip-flop is in a binary ONE state. Additionally, the decoder network 203-28 receives a mode signal from the process state register 204-20. The state of the signal which indicates whether the processor 200 is in a master or slave mode of operation is "ANDED" with the output signal and is used to generate an exception signal on another output line which is applied as an input to process control register 204-22 and to one causes selection of the exception-interrupt position of switch 201-14. As explained herein, this prevents alteration of the contents of the process state register location (GR0) of scratch pad memory 203-10.

The contents of an addressed register location are read out into a scratch buffer register 203-16 via a first two position data selector switch 203-18. The contents of the buffer register 203-16 are then selectively applied to processing section 204 via a further two position data selector switch 203-20. The different positions of each of the data selector switches 203-14, 203-18, and 203-20 are selectable by different fields contained in the microinstructions read out into register 201-15. The scratch pad memory 203-10 receives data signals applied from one of a pair of output buses selectively connected to any one of four working registers of block 204-12.

Each set of 16 registers includes a process state register (PSR) location (general register 0) for storing information essential to controlling the current process. The first eight bit positions of the register stores steering information coded to identify the interrupting module. The next position is a privilege bit position coded to identify the mode of operation (i.e. master or slave). The register also includes an external register bit position coded to indicate whether the register contents can be altered, an address mode bit position, two condition code bit positions, a carry bit position and 22 bit positions for storing a count which is periodically decremented while the associated process is active (i.e. serves as a "process timer"). Because of the frequency of access to the contents of the process state register required for modification or reference, signals representative of the contents of this register are stored in one of the registers of the processing section 204 (i.e. register 204-20). Thus, the general register storage location for storing the contents of the process state register serves to store the current value of the process state register of section 204 upon the occurrence of an interrupt.

Each group of registers further includes an instruction counter (general register 1) for storing the address of the current instruction of the process associated therewith. Additionally, each group of registers include a page table base register (general register 15), and a number of general registers (general registers 2-14) for providing temporary storage for operands and address information. The scratch pad memory 203-10 also includes a control block base (CBB) register location which stores an absolute address pointing to the base of an exception control block and interrupt control block tables stored in local memory module 500. The first register GR0 of the highest priority set of registers (level 0) which is never altered, stores the control block base information. The interrupt control block (ICB) tables include 256 groups of storage locations which store information for processing the type of interrupt. The exception control block (ECB) tables include 16 groups of storage locations which store information for processing the type of exception.

Exceptions are processor detected conditions which cause the processor 200 to enter automatically one of the 16 exception processing routines. The exception conditions are identified by a four bit exception number which corresponds to bits 10-13 of the program instruction when the processor enters master mode. In all other instances, the exception number is ZERO. The exception number (ECB#) is used to identify one of the four word exception control blocks (ECB) which points to an exception processing routine. The byte address of an ECB equals the control block base (CBB) − 16 (ECB # +1). Each ECB includes values for loading the PSR, IC and PTBR registers in addition to a saving area pointer which serves as a stack area for storing information pertinent to the current process before the processor 200 enters the exception routine.

The address of an interrupt control block (ICB) equals the control block base (CBB) + 16(ICB#). The ICB# is obtained from the interrupt word as explained herein. Similarly, the ICB is a four word block and it contains values for the PSR, IC, GR14 and PTBR registers.

Processing Section 204

This section performs all of the arithmetic and logic operations required to process program instructions. The section 204 includes an adder/shifter unit 204-1 capable of performing arithmetic, shift and logic operations upon a pair of 36 bit operands. The results produced by either an adder portion or shifter portion of unit 204-1 are selected in response to microinstructions and thereafter selectively transferred via a four position data selector switch 204-8 on a pair of output lines to any one of the working registers of block 204-12 and to a data output register 204-14. The data output register 204-14 connects to the lines of the processor data interface 600.

For the purposes of the present invention, the adder/shifter unit 204-1 can be considered conventional in design. Also, the unit 204-1 may include either circuits such as those disclosed in U.S. Pat. No. 3,811,039 to John P. Stafford or circuits disclosed in other documents referenced in the introductory portion of the present specification.

The block 204-12 includes four working registers R0 through R3 which provide temporary storage for the instruction counter and for addresses during instruction execution. The registers can be loaded from any one of the sources connected to switch 204-8 (i.e. adder/shifter 204-1, address switch 204-6, PSR/PCR switch 204-24 and scratch pad buffer input switch 203-18). The register to be loaded and the write signal required for loading the register is established by fields included within the microinstruction read out to register 201-15.

As seen from FIG. 2, the registers are connected to a pair of output buses WRP and WRR. The WRP bus connects to address inputs 204-5, to switch 203-18 and to scratch pad memory 203-10. The WRR bus connects to A operand switch 203-20, to B operand switch 204-1, to register 204-20 and to register 204-22. The registers selected for connection to the WRR and WRP buses are designated by a pair of fields included within the microinstruction read out to register 201-15.

As seen from FIG. 2, the processing section 204 includes process state register 204-20 and a process control register 204-22. The process state register 204-20 as mentioned is loaded from scratch pad memory 203-10 via output bus WRR. The process control register 204-22 is a 36 bit register common to all eight interrupt levels.

The bit positions of the process control register 204-22 contain the following information. Bit positions 0-8 designate different types of non master mode exceptions which include the following.

| PCR BIT POSITION | EXCEPTION TYPE |
|---|---|
| 0 | Operation not complete; no response from SIU 100 on lines ARA or ARDA. |
| 1 | Page address bounds fault (key check). |
| 2 | Page access fault |
| 3 | Page not resident in memory |
| 4 | Illegal operation |
| 5 | Process timer run out |
| 6 | Overflow |
| 7 | Lockup fault |
| 8 | Address misalignment |

The term "fault" does not necessarily mean the occurrence of a hardware failure but includes error conditions, etc.

Bit positions 9-15 identify the location of parity errors and bit positions 23-26 identify the processor number and level received from the PNID and AIL lines. Bit position 27 is an interrupt inhibit bit position while bit positions 28-35 store interrupt request bits which when set to a binary ONE indicate an interrupt at a level corresponding to the bit position (e.g. bit 28 = level 0). The bit positions 27-35 are loadable by program instruction from the bank of registers of block 204-12 via output bus WRR. The contents of each of the registers 204-20 and 204-22 are selectively applied as an input to another one of the positions of the four position data selector switch 204-8 via a two position data selector switch 204-24. The register 204-20 also connects to the PI positions of a two position steering selector switch 204-10 and a four position address selector switch 204-6.

The steering switch 204-10 provides steering information to the SIU 100 which is used to transfer the command to the correct module. One of the fields contained in the microinstructions read out to register 201-15 selects the appropriate position for either a memory command or PI command. The steering information for a memory command is generated from fields included within the microinstruction and with paged address information from scratch pad memory 204-4 or absolute address information from bus WRP.

For a R/W command, the steering information is generated as follows: bit 0 is a binary ZERO for a R/W command; bit 1 defines local/remote memory and corresponds to PTW bit 0 (paged) or WRP bit 0 (absolute). Bits 2-4 correspond to PTW bits 1-3 (paged) or WRP bits 1-3 (absolute). Bits 5-6 correspond to bits of one of the fields of the microinstruction which are coded to designate whether it is a single or double word transfer and whether it is a read or write cycle of operation. Upon the start of a memory cycle or initiation of a command, the signals from the steering switch 204-10 are loaded into a steering register 204-16 which applies the signals to the appropriate lines of the data interface 600 of processor 200. As explained herein, the command including additional steering information is provided by position 2 of address switch 204-6 in the case of a PI command.

As also seen from FIG. 2, processing section 204 includes a scratch pad memory 204-4 addressable via address inputs 204-5 which receives address signals from one of the registers connected to the WRP bus. The scratch pad memory 204-4 provides page table address storage for each of the eight interrupt levels used in generating absolute addresses for addressing local memory module 500. When addressed, the contents of the storage location of scratch pad memory 204-4 are read out to two of the four positions of the address switch 204-6. These two positions are used for page referencing of local memory module 500. Since the paging operations of scratch pad memory 204-4 are not particularly pertinent to the present invention, no detailed discussion is included herein.

The other two positions of the address selector switch 204-6 are used to provide the memory of PI command. More specifically, position 1 of address switch 204-6 when selected by an address control field of a microinstruction word stored in register 201-15 generates the R/W memory command information which includes bits 0-8 in accordance with predetermined fields of the microinstruction word and bits 9-35 coded to correspond to either paged address information from memory 204-4 or absolute address bits applied to output bus WRP by the working registers of block 204-12. When the PI position of switch 204-6 is selected, the switch generates a programmable interface command word wherein bit 0 is a binary ZERO, bit 1 is supplied by a field of the microinstruction word stored in register 201-15, bit 2 is supplied by bit 9 of PSR register 204-20 and defines whether the current process can alter certain external registers, bits 5-8 are equal to bits 4-7 of register 204-20 and define the port or subchannel within the module, bit 3 is coded to specify the processor pair number supplied by the SIU 100, bit 4 is a ZERO and bits 9-35 equal bits 9-35 of bus WRP which correspond to the absolute address of the PI command.

DETAILED DESCRIPTION OF LOCAL MEMORY MODULE 500

Figure 4:
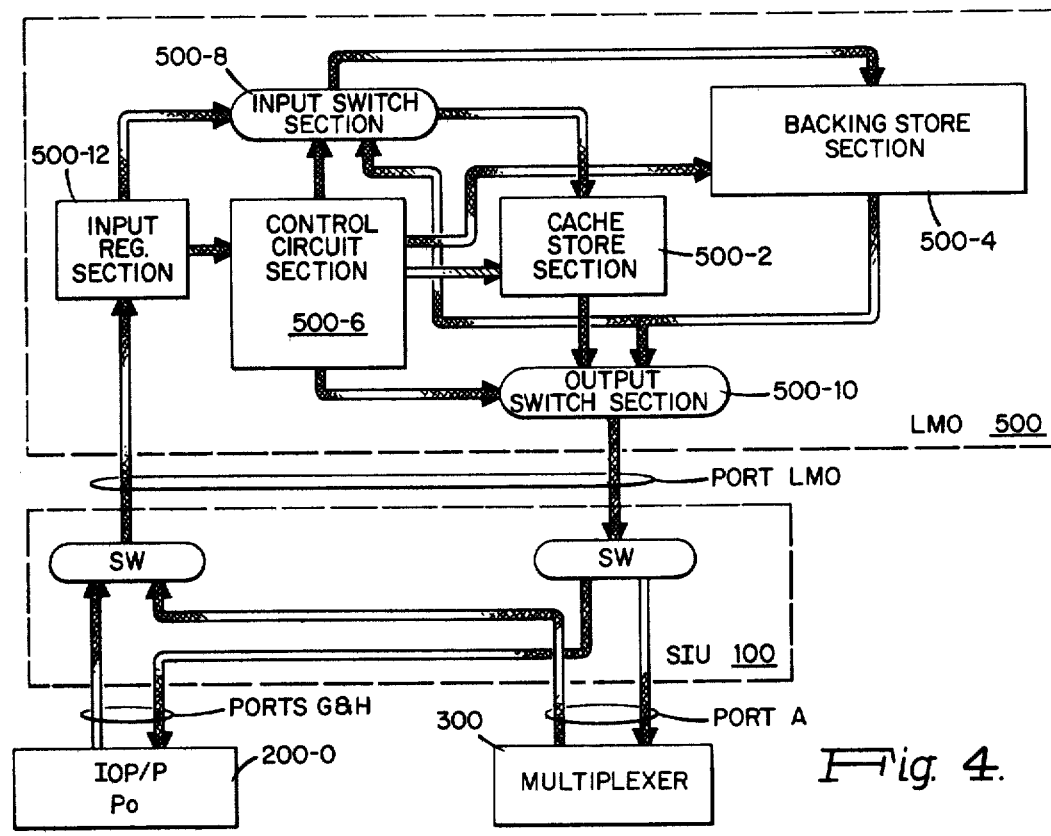
FIG. 4 shows in block diagram form the local memory module of FIG. 1.
Figure 5:
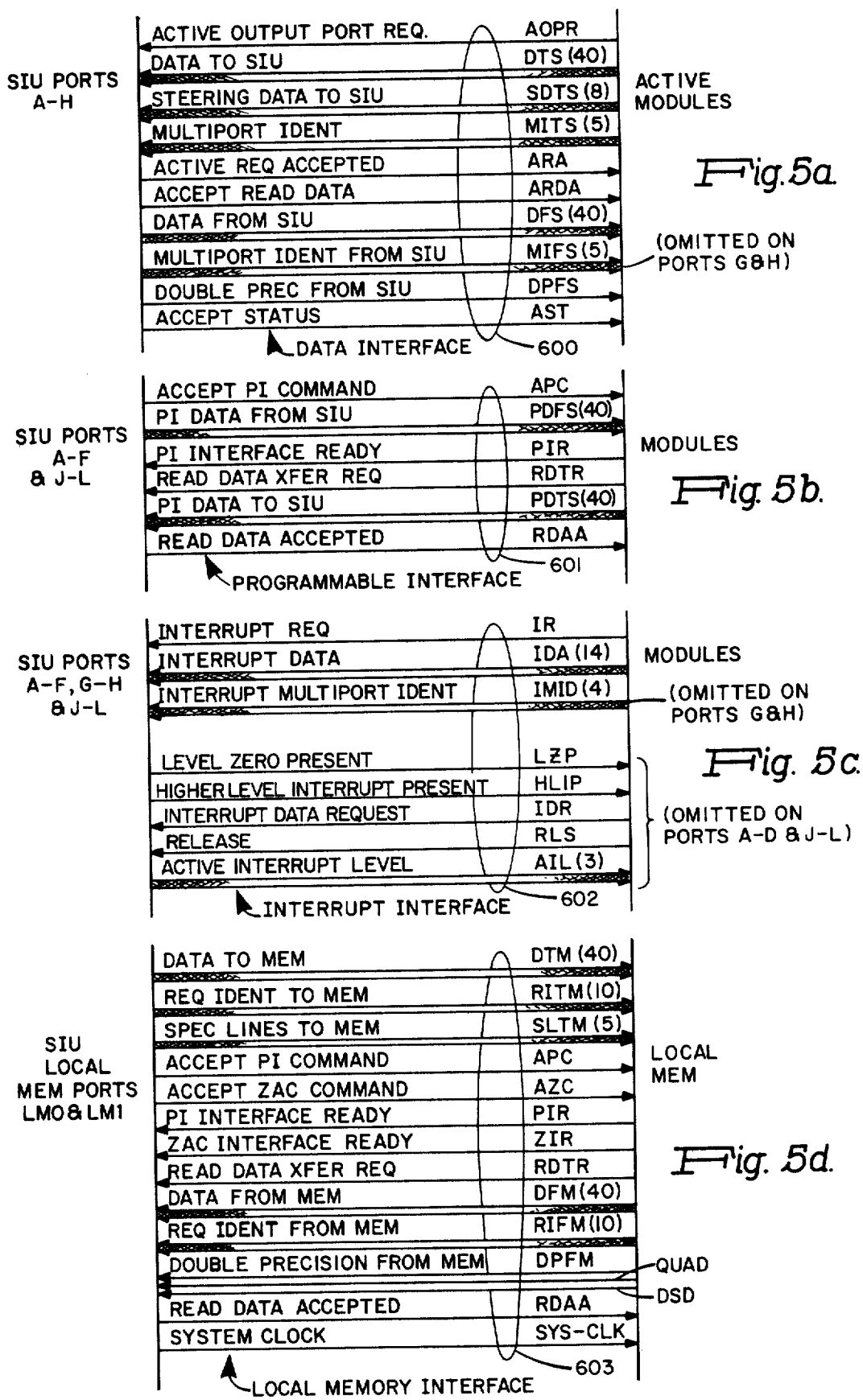
FIGS. 5a through 5d show the various interfaces of FIG. 1.

FIG. 4 illustrates the major blocks which comprise the system of the present invention and a preferred embodiment of local memory module 500 in accordance with the teachings of the present invention. Referring to the figure, it is seen that module 500 includes a cache store section 500-2, a backing store section 500-4, an input register section 500-12, a control circuit section 500-6, an input switch section 500-8 and an output switch section 500-10 arranged as shown. The output switch section 500-10 and input register section 500-12 transfer and receive data and control information to and from either the processor pair P0 or multiplexer module 300 via SIU 100 switches as explained herein.

Figure 6:
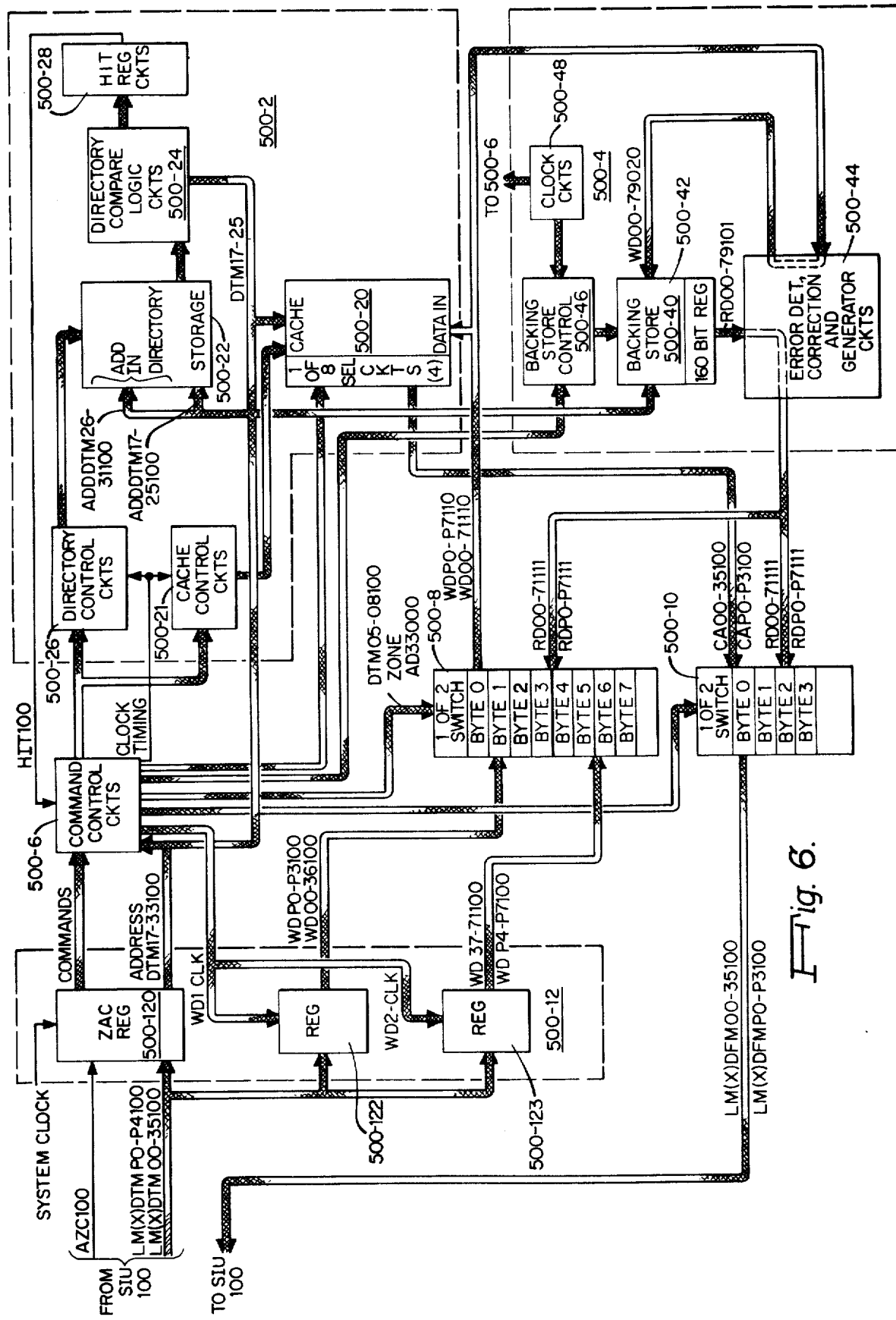
FIG. 6 shows in greater detail the local memory module of FIG. 4.

The cache store section 500-2 shown in greater detail in FIG. 6 includes a cache 500-20 with associated control circuits 500-21, a directory storage unit 500-22 with associated comparison circuits 500-24, hit logic circuits 500-28 and control circuits 500-26 arranged as shown. The cache store is organized into four levels or sections each of which are constructed from a plurality of bipolar circuit chips, conventional in design. Each level is divided into eight byte sections with each byte section including five bipolar circuit chips. The circuit chips each contains 128 addressable two bit wide storage locations with the total number of chips providing a capacity of 64 block address locations or 256 address locations wherein each block is defined as 4, 40 bit words, each word having four bytes (byte = 9 data bits + 1 parity bit).

The directory storage unit 500-22 stores the addresses of each cache block and is similarly organized into four levels. The unit 500-22 includes a round robin counter arrangement (not shown) for establishing which level of cache is to be written during a next cycle of operation. The different levels of cache define a column of 80 bits and cache block includes two such columns. The directory storage unit 500-22 is thus divided into a number of columns corresponding to the number of blocks in the cache. For the purpose of the present invention, the organization can be considered conventional in design and may be likened to the arrangement disclosed in U.S. Pat. No. 3,845,474 invented by Ronald E. Lange, et al. During a cache cycle of operation, four bytes are read out to the output multiplexer switch 500-10 via a number of one of eight selector circuits.

Figure 7:
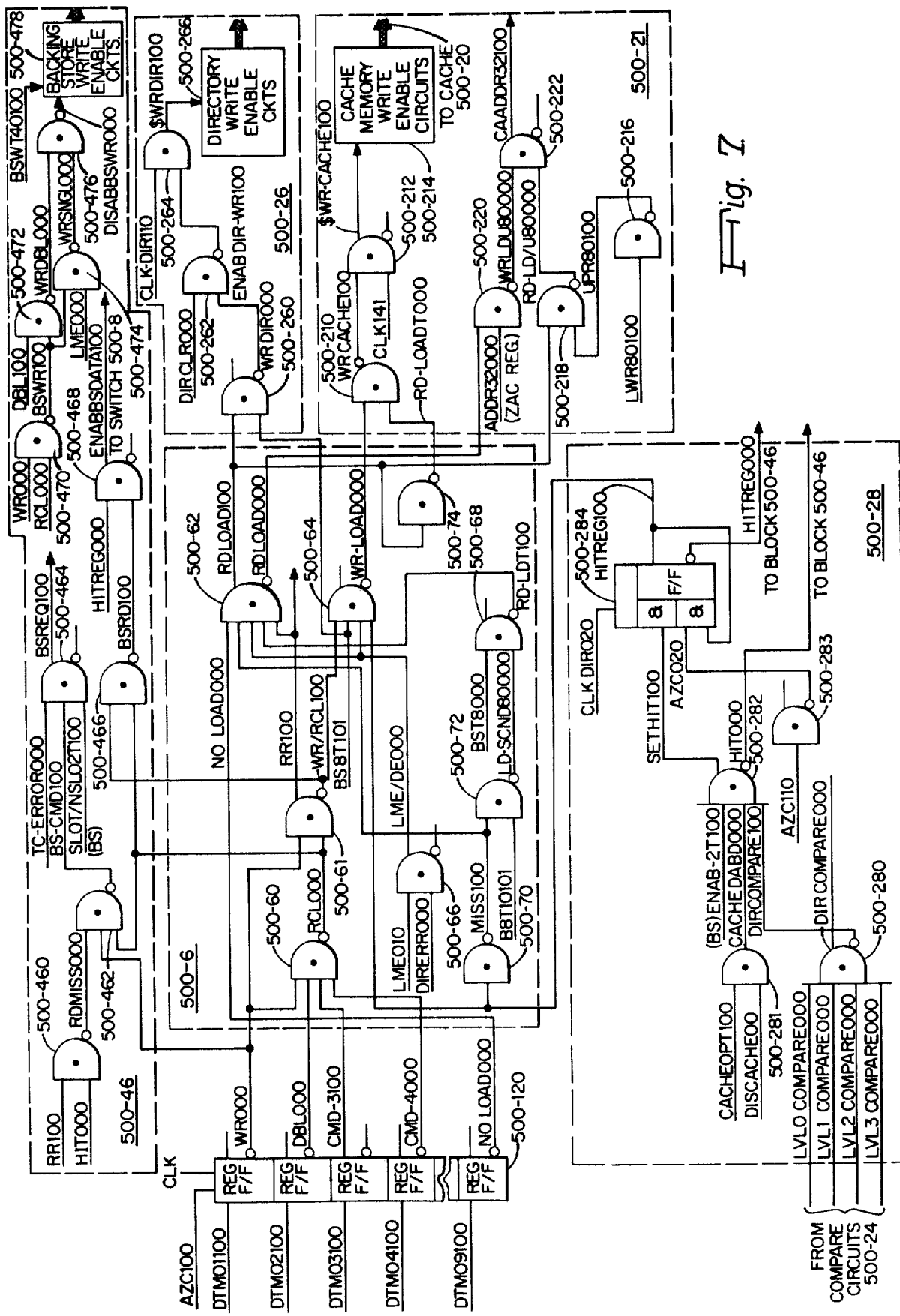
FIG. 7 shows in greater detail certain portions of FIG. 6.

The directory storage unit 500-22 applies address signals to the comparison circuits of block 500-24. These circuits, conventional in design, operate to detect whether the information being requested resides in cache at any one of the four levels (i.e., presence of a hit). The compare circuits 500-24 apply the results of the comparison to the hit circuits of block 500-28. The hit circuits 500-28 in turn store the hit indications which are applied as inputs to the control logic circuits of block 500-6. The backing store section 500-4 includes a backing store 500-40, timing circuits 500-48, a 160 bit output register 500-42, data correction and parity generator circuits 500-44 and a number of control circuits of block 500-46 arranged as shown in FIG. 7. The circuits 500-48 include counter and delay line circuits. Conventional in design, which provide timing and control signals for synchronizing the overall operation of the memory module 500-2.

The backing store 500-40 is constructed from 4K MOS memory chips, conventional in design and has a capacity of 128K of memory words, each word having 40 bits (32K blocks). The data correction and parity generation circuits operate to detect and correct errors in the words being read from and being written into backing store 500-40. For the purpose of the present invention, these circuits may be considered conventional in design.

As seen from FIG. 6, the input register section includes a zone, address and command (ZAC) register 500-120, a first word buffer register 500-122 and second word buffer register 500-123 connected as shown. The ZAC register 500-120 stores the ZAC command word which has the format shown in FIG. 8. The input buffer registers 500-122 and 500-123 are connected to receive the data word or words of a ZAC command applied to the DTM lines of interface 603 by a requester module. The contents of registers 500-122 and 500-123 are applied to different byte positions of the one of two multiplexer switch 500-8. In accordance with the present invention, the switch 500-8 also receives the data read from backing store which is merged with the new input data with the merged data being written into backing store 500-40 and cache 500-20 as explained herein.

The command contents of the ZAC register 500-120 are applied to decoder gating circuits included in block 500-6 while the address signals are distributed to the circuits of block 500-6, directory storage unit 500-22, cache 500-20 and backing store 500-40 for the addressing thereof.

The circuits of block 500-6 generate the various control and timing signals for conditioning different portions of the local memory module for carrying out the operation specified by the command stored in ZAC register 500-120. This includes distributing control signals to input multiplexer switch 500-8 and to output multiplexer switch 500-10 for selecting the group of data signals to be written into backing store 500-40 and to be read from backing store 500-40 and cache 500-20 respectively. For the purpose of the present invention, the multiplexer or data selector circuits and registers in addition to the circuits of FIG. 7 to be discussed herein can be considered conventional in design and may take the form of circuits disclosed in the aforementioned Texas Instruments text.

FIG. 7 shows in greater detail certain ones of the circuits of blocks 500-6, 500-21, 500-26 and 500-46. Referring to the figure, it is seen that the control circuits of block 500-6 include a plurality of AND/NAND gates 500-60 through 500-74. The gates 500-60, 500-61 and 500-62 are connected to receive different ones of the ZAC command bit signals and the cache bypass signal from ZAC register 500-120. These signals are combined as shown and applied to gates 500-64 and 500-74. The resulting read load and write load command signals are applied to the cache control circuits 500-21, the directory control circuits 500-26 and the backing store control circuits 500-46 as shown. The other command signals such as RCL000 and RR100 are also applied to the backing store circuits 500-46.

As seen from FIG. 7, the cache control circuits 500-21 include series connected NAND/AND gates 500-210 and 500-212 which provide a write cache timing signal, WRCACHE100, to a write clock enable circuit 500-214. The write enable circuit 500-214 includes logic gating circuits, conventional in design, which provide the appropriate timing signals to the cache 500-20 required for its execution of a write cycle of operation. Additionally, the control circuits further include AND/NAND gates 500-216 through 500-222 which are operative to modify the state of address bit 32 as required for writing into cache either 80 bits of updated data or a block of data from backing store 500-40 in response to a write command and a read command respectively.

Similarly, the directory control circuits include series connected NAND/AND gates 500-260, 500-262 and 500-264, the last of which provides a write directory timing signal WRDR100 to a write enable circuit 500-266. The write enable circuit 500-266 includes logic gating circuits, conventional in design, which provide the appropriate timing signals to the directory storage unit 500-22 required for its execution of a write cycle of operation.

The backing store control circuits 500-46 include a first group of series connected AND/NAND gates 500-460 through 500-468. These gates are operative to generate a backing store request signal BSREQ100 and enable data signal to initiate a backing store read-write cycle of operation and allow transfer of backing store data to SIU 100. The gates 500-460 through 500-468 generate backing store request signal BSREQ100 for a read/restore cycle of operation in the absence of a directory hit (i.e., signal HIT000=1), a write cycle of operation and for a read/clear cycle of operation. A second series connected AND/NAND gates 500-470 through 500-476 is operative to generate a disable backing store write signal DISABBSWR100 upon the occurrence of an error condition (i.e., signal LME000 is a binary ZERO). During the read portion of a WRITE cycle, for example, the detection of an uncorrectable error condition, forces signal LME000 to a binary ZERO. This inhibits the enabling of the circuits of block 500-478 as well as the circuits of blocks 500-266 and 500-214.

The last group of circuits in FIG. 7 constitute the hit register circuits 500-28 of FIG. 6. The circuits include NAND/AND gates 500-280 and 500-282 in addition to an AND gate 500-281 connected as shown. The NAND/AND gate 500-280 receives the resulting comparison signals from comparison circuits 500-24 and applies an indication of a directory comparison to gate 500-282. The output of gate 500-282 in turn is applied to the set input of a hit register flip-flop 500-284. A NAND/AND gate 500-284 receives an accept ZAC signal from SIU 100 which it complements and applies to a reset input of flip-flop 500-284. The binary ONE and ZERO output signals from flip-flop 500-284 and thereafter distributed to different ones of the blocks of FIG. 7 as shown. The circuits of block 500-478 include conventional gates which are operative to generate write signals.

DETAILED DESCRIPTION OF SYSTEM INTERFACE UNIT 100

Interrupt Section 101

Figure 3A:
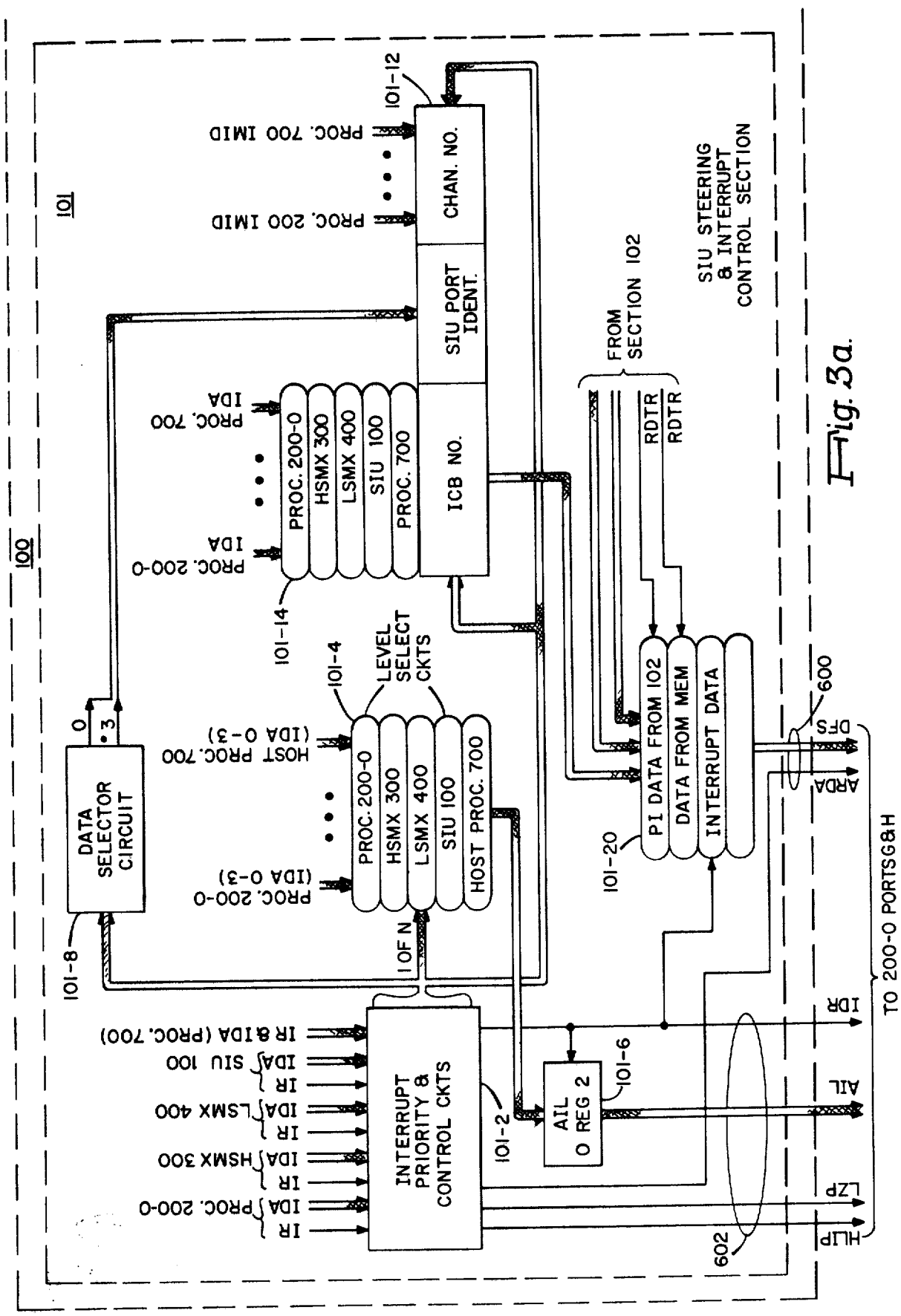
FIGS. 3a and 3b show in greater detail the system interface unit of FIG. 1.

The System Interface Unit 100 as mentioned provides for communication between modules of the system of FIG. 1 via a plurality of crossbar switches. Separate crossbar switches are used to collect signals from the lines of each of the different interfaces of the modules. FIG. 3a shows the switches and circuits of interrupt section 101 for handling the module interrupt interfaces. In the system of FIG. 1, there are modules which connect to ports LMO, A, E, G and J, each of which apply signals to the SIU 100 via different ones of the lines of its interrupt interface 602. Additionally, SIU 100 also provides signals via an interrupt interface associated with port L of FIG. 1.

As seen from FIG. 3a, each of the modules when requesting service applies a signal on its interrupt request (IR) line together with appropriate interrupt identifier information on its IDA lines which are applied to the circuits of an interrupt priority and control block 101-2. The circuits of block 101-2 monitor all interrupt interfaces and signals the appropriate processor corresponding to processor 200 when there is a request having a priority higher than that of the process being executed. When processor 200 signals that it is able to accept the request, the SIU 100 gates the identifier information associated with the highest priority request to processor 200. The identifier information includes an eight bit interrupt control block number including a parity bit, a three bit interrupt level number and an one bit processor number with a parity bit and a four bit channel number.

Considering interrupt section 101 in greater detail, the circuits of block 101-2 include decoder circuits which decode the processor number and interrupt request signals. Providing that there is no parity error, the output signals from the decoder circuits are applied to priority logic circuits of the designated processor logic circuits. The priority logic circuits decode the interrupt level signals and determine the highest priority level and then determine the port priority so that the module having the highest priority level and highest port priority is selected. The interrupt port priority within any given level is as follows:

Old; port L; port A, port B, port C; port D; port E; port F, port G; port H; port J and port K.

This means that in the system of FIG. 1 that the port of the current process has the highest priority followed by the SIU 100, the high speed multiplexer 300, the host processor 700, the processor 200 and the low speed multiplexer 400.

The priority circuits of block 101-2 are operative to generate an output signal on one of n number of output lines, n corresponds to the number of interrupting modules within the system. The n output lines are applied to an eight position data selector switch 101-4 which selects the interrupt level signals of a level of interrupt having a priority higher than the level currently in progress to be loaded into a register 101-6. The output signals from register 101-6 are applied to the AIL lines when processor 200 forces the IDR line to a binary ONE in response to the SIU 100 having forced prior to the higher level interrupt present (HLIP) line or the level zero present (LZP) line to a binary ONE. When the current process is not inhibited from being interrupted, an interrupt request causes the processor 200 to suspend the current process and to accept an interrupt word from the SIU 100 including the identifier information mentioned previously. More specifically, the interrupt word is formatted as follows.

Bit 0 is a new interrupt bit position. When set to a binary ONE indicates that the interrupt is a new one and when set to a binary ZERO indicates that the interrupt is that of a previously interrupted process that is to be resumed.

Bits 1-17 are unused and are binary ZEROS.

Bits 18-27 define the interrupt control block number with bits 18 and 27 being set to binary ZEROS.

Bits 28-31 are generated by the SIU 100 and identify the source module as explained herein in accordance with the present invention.

Bits 32-35 are generated by the modules having multiple ports and identify the subchannel or port within the source module as explained herein in accordance with the present invention.

For more detailed information regarding the implementation of the circuits of block 101-2, reference may be made to the copending patent application titled "Priority Interrupt Hardware" referenced in the introductory portion of the specification.

It is also seen that the output lines from interrupt priority circuits 101-2 are applied to a further data selector switch circuit 101-8. Since only the requesting module having the highest priority will apply a signal to selector circuit 101-8, the selector circuit is connected to provide a predetermined wired-in set of coded steering signals which identify the physical port to which the requesting module granted priority connects (i.e. bits 28-31 of the interrupt word).

In the present embodiment, the following steering codes are generated for identifying the modules of FIG. 1.

| CODE | SIU PORT (MODULE) IDENTIFIED |
|------|------------------------------|
| 0000 | Local memory module - port LMO |
| 0001 | port K |
| 0010 | SIU 100 - port L |
| 0101 | Low speed multiplexer 400 - port J |
| 0110 | processor 200 - port G |
| 1101 | high speed multiplexer 300 - port A |
| 1110 | host processor 700 - port E. |

The four bit code generated by the selector circuit 101-8 is in turn applied to a group of conventional AND gating circuits included within a gating network 101-12. The other identifier information provided by the different source system modules are also applied to other gating circuits of network 101-12. Specifically, each module applies an interrupt control block number (ICBN) via its IDA lines to a different one of the positions of an eight position data selector switch circuit 101-14. Additionally, each module provides the information identifying the requesting subchannel or port of the source module to other ones of the gating circuits of network 101-12 via the IMID lines of the interrupt interface. When the processor 200 forces its interrupt data request (IDR) line to a binary ONE, the SIU 100 applies the signals from gating network 101-12 to the data from SIU (DFS) bus lines of the processor data interface 600 via one of the positions of a four position data selector switch circuit 101-20. The other positions of switch 101-20 are not shown since they are not pertinent to an understanding of the present invention.

Data Transfer Section 102

Figure 3B:
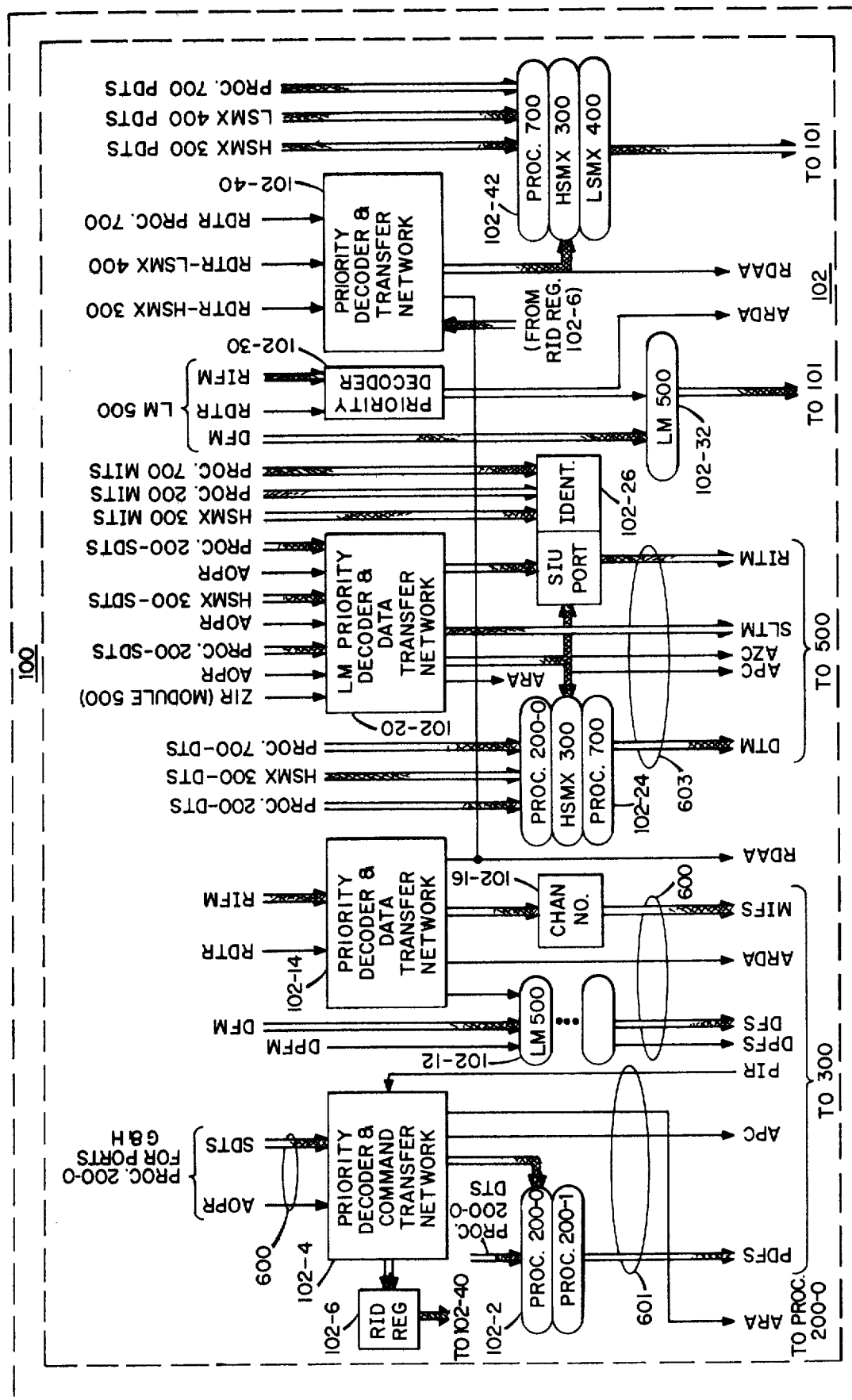

FIG. 3b shows the data transfer section 102 of the system interface unit 100. This section includes priority circuits which establishes which source module is to transfer commands to the high speed multiplexer 300 on its programmable interface 601 and which source module is to transfer data to the multiplexer 300 on its data interface 600. Additionally, section 102 includes priority circuits which determine which source module is going to transfer either data or commands to local memory module 500.

It will be appreciated that transfers between a pair of modules occurs when one module has generated a request to the other module and that the request has been accepted by the other module. In order for a request to be accepted, the requesting module must have the highest priority, both modules must be in a state to receive information and that the transfer path over which the transfer is to take place must be available (i.e. not busy).

As concerns the signals applied to section 102 by processor 200, the generation of these signals is to a large extent controlled by the different fields of the microinstructions read out into processor register 201-15 of FIG. 2. For example, the active output port request (AOPR) line from processor 200 applied to the circuits of block 102-4-is enabled in accordance with a SIU request type control bit field of each microinstruction read out to register 201-15 which is coded to define a transfer of a read/write memory or programmable interface command. The data to SIU lines (DTS) of the processor data interface 600 applied to a two position data selector switch 102-2 constitute command information generated under microprogram control which is loaded into the processor data output register 204-14 of FIG. 2. The steering data to SIU (SDTS) lines receive signals generated under microprogram control which are loaded into the processor steering register 204-16 of FIG. 2.

For the system of FIG. 1, only I/O processors transfer commands to the multiplexer 500 only and processor 200 applies signals to network 102-4. The network 102-4 therefore includes decoder circuits which decode the steering information from the processor module to establish when the module desire to transfer commands to the multiplexer 300. IN the case of more than one I/O processor when more than one module desires to transfer during the same cycle, a priority network included in network 102-4 selects the module assigned the highest priority and enables the transfer of a command by that module to the multiplexer 300 on the PDFS lines of its programmable interface 601. More specifically, the network 102-4 applies signals to the two position selector switch 102-2 which selects signals from the appropriate module. This occurs when the multiplexer 300 signals the SIU 100 that it is ready to accept a command by forcing the PIR line to a binary ONE. At the same time, network 102-4 forces the APC line to a binary ONE signaling the multiplexer 300 to accept the command applied to the PDFS lines. When the processor 200 executes an instruction causing it to send a programmable interface (PI) command to the multiplexer 300, the processor 200 places the processor number identification into bit 3 of the command. The multiplexer 300 stores the processor number contained in the command until it wants to issue an interrupt request at which time the processor number is included as part of the interrupt data as explained herein. When the PI command is forwarded to multiplexer 300, the steering information identifying processor 200 as the requester is stored in a register 102-6 associated with multiplexer 300 (port A). As explained herein, when multiplexer 300 responds by generating a read data transfer request to SIU 100, the contents of register 102-6 is used to identify processor 200 as the actual module to receive the data.

A similar arrangement is employed for transferring data signals to multiplexer 300. In FIG. 1, memory module 500 is the only module which transfers data to multiplexer 300. Such transfer occurs in response to a read memory command (ZAC) forwarded to the memory module 500 by multiplexer 300 via network 102-20 as explained herein. When multiplexer 300 forwards the command, the SIU 100 generates the appropriate 4 bit requestor identifier code (steering code) which it appends to the multiport identifier information received from multiplexer 300. The information is stored by the memory module 500 and returned to the SIU 100 when the module 500 generates a read data transfer request to designate that multiplexer 300 is to receive the data. Also, when the SIU 100 accepts the request, it notifies the multiplexer 300 by forcing line ARDA to a binary ONE.

The read data transfer request (RDTR) line when set by memory module 500 signals the network 102-14 that it is ready to transfer information read out during a cycle of operation. The local memory module 500 also supplies signals to the requestor identifier from memory (RIFM) lines to identify the requesting module to which the information is to be transferred.

More specifically, circuits within a decoder network 102-14 decode the identify signals applied to the RIFM lines and when the signals indicate that the local memory module 500 is ready to transfer information to the multiplexer 300 (assumed the multiplexer 300 is ready to receive the information), the decoder network 102-14 applies the appropriate signals to the selector switch 102-12 and circuits within a gating network 102-16.

Additionally, decoder network 102-14 applies a signal to the accept read data (ARDA) line of the data interface signaling the multiplexer 300 that it is to accept the data from SIU (DFS) lines of its interface 600. The circuits of block 102-16 apply the appropriate multiport identifier information to multiport identifier from SIU (MIFS) lines identifying the requesting subchannel which is obtained from the RIFM lines. When the transfer has taken place, the network 102-14 forces the RDAA line to a binary ONE signaling the requesting module that the data has been accepted from memory module 500.

An arrangement similar to network 102-14 is used by SIU 100 to transfer PI and memory commands from any one of the modules of FIG. 1 to local memory module 500. The module 500 is operative to force either the programmable interface request (PIR) line or ZAC interface request (ZIR) line applied to a decoder network 102-20 to a binary ONE when it is ready to accept either a programmable interface or memory command. Additionally, the processor 200, the processor 700 and multiplexer 300 apply a network 102-20 signals to the active output port request (AOPR) line and steering data to SIU lines of their respective data interfaces. The network 102-20 upon decoding the steering information applied by each of the modules is operative to generate the appropriate signals to a three position selector switch 102-24 for enabling the module having the highest priority to apply signals to the data transfer to SIU lines of memory module data interface 603. It is also seen that network 102-20 applies signals to either the accept programmable command (APC) line or accept ZAC command mode (AZC) together with the appropriate requestor identification signals on the request identifier to memory (RITM) lines of the local memory module interface 603 via a gating network 102-26.

The last two networks 102-30 and 102-40 are used to transfer memory data and programmable interface data to processor 200 in response to memory commands and PI commands respectively previously generated by the processor 200. As seen from FIG. 3b, the priority decoder network 102-30 has the same input lines as network 102-14 and operates in the same manner to forward the requested memory data to processor 200 via a data selector switch 102-32 and the four position selector switch 101-20 of FIG. 3a. It will be appreciated that since processor 200 processes a single command at a time, there can be no conflict between the modules applying data to selector switch 101-20 for transfer to the processor DFS lines in response to processor requests. That is, after the processor 200 sends a command to one of the modules of FIG. 1, its operation is stalled pending receipt of the requested data. The SIU 100 upon accepting the processor's request forces the processor'a ARA line which causes the processor to delay operations.

The separate network 102-40 processes return data requests from those modules responding to PI commands. The network 102-40 decodes the signals applied to the RDTR lines and from register 102-6 together with registers of the other modules, not shown. When the SIU 100 detects that module is trying to return requested data to processor 200 (i.e. requestor identifier stored in multiplexer 300 register 102-6), the network 102-40 generates signals which conditions a three position data selector circuit 102-42 to apply the signals from the PDTS lines of the PI interface of the module trying to return requested data to processor 200. These signals are in turn applied to the processor's DFS lines via selector switch 101-20 of FIG. 3a which is conditioned by the module request signal. During a next cycle of operation, the network 102-40 forces the RDAA line to a binary ONE signalling the module that the data applied to the PDTS lines has been accepted and that the module can now remove such data (i.e., clear its output register). Thus, it is seen that switch 101-20 selectively applies any one of three types of data to the DFS lines of the processor's data interface 600.

For the purpose of the present invention, the circuits included within different ones of the blocks of FIG. 3b may be considered conventional in design and include logic circuits found in the aforementioned publication by Texas Instruments Inc. Also, for the purposes of the present invention, the switching networks can comprise conventional crossbar switches.

DESCRIPTION OF OPERATION

The operation of the system of the present invention will now be described with reference to FIGS. 1 through 9. As seen from FIG. 8, the local memory module 500 is capable of carrying out a number of different types of ZAC commands. Briefly, the module 500 is capable of processing 5 different types of ZAC commands which are defined as follows:

1. Read Single—the contents (one word) of the addressed memory location are read and transmitted to the requester. Memory contents are not altered. ZAC bit 9 defines whether cache is to be loaded or bypassed. However, if that block is already loaded in the cache, the read cycle is done in the cache and the information is taken from cache.
2. Read-Clear Single—the contents (one word) of the addressed memory location are read and transmitted to the requester and the memory location (one word) is cleared to zeros with good parity (or EDAC) bits. The data block containing the addressed word is not loaded into the cache. If that block is already loaded in the cache, the addressed word is also cleared to zeros in the cache.
3. Read Double—the contents of the addressed pair of memory locations (two words) are read and transmitted to the requester word serially. Memory contents are not altered. ZAC bit 9 defines whether cache is to be loaded or bypassed. However, if that block is already loaded in the cache, the read cycle is done in the cache and the information it taken from cache.
4. Write Single—one to four bytes of the data word supplied by the requester are stored in the addressed memory location. The bytes to be stored are specified with the zone bits. Zone bits 5, 6, 7 and 8 control bytes 0, 1, 2 and 3 respectively. The memory contents of byte positions that are not to be stored remain unaltered. The data block containing the addressed word is not loaded in cache. However, when the block is already in cache, the word is updated.
5. Write Double—the two data words supplied by the requester are stored in the addressed pair of memory locations. The data block is not loaded into cache. However, when the block is already in cache, the two words are updated.

The specific codes for the different ZAC commands are as follows. The other possible eleven codes are defined as being illegal and produce an error signal as explained herein.

| CMD | ZONE | | | | CACHE BYPASS BIT | |
|---|---|---|---|---|---|---|
| 1 2 3 4 | 5 | 6 | 7 | 8 | 9 | |
| 0 0 0 0 | 0 | 0 | 0 | 0 | 1/0 | Read Single |
| 0 0 1 0 | 0 | 0 | 0 | 0 | — | Read Clear Single |
| 0 1 0 0 | 0 | 0 | 0 | 0 | 1/0 | Read Double |
| 1 0 0 0 | 1/0 | 1/0 | 1/0 | 1/0 | — | Write Single (Zoned) |
| 1 1 0 0 | 1 | 1 | 1 | 1 | — | Write Double |

By way of example, it is first assumed that one of the processors 200 of pair PO is operative to begin execution of a series of program instructions specifying the referencing of local memory module 500. In this example, the first and successive instructions are formatted to include at least one field specifying a general register which stores an index value and another field including an address syllable. The general register index value contents defines the state of bypass bit 9 which is assumed to have been set to a binary ZERO. The processor 200 combines the information to produce an absolute address.

Once the absolute address has been calculated, the processor 200 generates the required memory command word and appropriate SIU steering information for directing the command to local memory module 500. The steering and command have the formats shown in FIG. 8.

Considering the above in greater detail, the op code of each instruction is coded to specify a memory reference operation performed by the generation of a ZAC command. The op code of the first instruction is applied by instruction register switch 202-4 to memory 201-2 which causes the memory to reference one of the locations. The contents of the location are read out into register 201-4 and include a pair of addresses specifying the storing addresses in control store 201-10 of the microinstruction sequences required for instruction processing.

During a first phase of instruction processing which begins during the execution of a current instruction, the index bits of the next instruction are used to address a specified one of the general register locations of scratch pad memory 203-10 via position 3 of switch 203-14 (i.e., Lev, XR1). The contents of the location are read out to buffer 203-16.

The contents of the index register are applied via position 0 of switch 203-20 to the A operand input of adder 204-2 which the displacement field of the instruction is applied via position 0 of switch 204-1 to the B operand input of adder 204-2. The two are added together and the result is transferred to working register R2 via switch 204-8. When there is a second level of index specified, a similar operation is performed which adds the value stored in the second general register location to the previously stored result in register R2. It will be readily appreciated that the appropriate value for bit 9 could have been stored in the second general register rather than in the first general register.

During the execution phase of the instruction, the processor 200 operates to generate a ZAC command to local memory 500 specifying a read operation and apply the appropriate memory address obtained from either memory 204-4 or R2 register. Assuming an absolute address, the address from register R2 is applied to the WRP bus and loaded into the data out register 204-14 via the R/W position of address switch 204-6 and cross bar switch 204-8.

The steering switch 204-10 provides the SIU steering for the memory cycle of operation. The signals have the format of FIG. 8 and provide information for use by SIU 100 for transferring the R/W command to local memory module 500 or to port LM0 to which the module 500 connects. They are loaded under microprogram control from register 201-15 and from address switch 204-6 via the R/W position of steering switch 204-10 into bit positions 0-8 of steering register 204-16.

For further information regarding the coding of microinstruction fields and the generation of steering information, reference may be made to the copending application "Memory Access System".

Following the loading of both registers 204-4 and 204-16, the processor 200 forces the AOPR line to a binary ONE which begins the signal sequence for transfer of the R/W command to local memory module 500. Also, the processor 200 increments the instruction counter (IC) and stores the result in working register R3. Then the processor 200 delays execution of the next microinstruction until it receives a signal via the ARA line from the SIU 100 indicating the acceptance of the request.

The SIU 100 views the R/W command as requiring a pair of SIU cycles, an address/command cycle followed by a data cycle. Assuming that the local memory module 500 is ready to accept the command, the ZIR line is a binary ONE (in FIG. 9 the waveforms are shown in terms of negative logic signals). The SIU priority network 102-4 of FIG. 3b is operative to apply the command word via a SIU selector switch to the DTM lines of the local memory interface 602 during a cycle of operation. The processor 200 waits holding the command word in the data out register 204-14 until the SIU 100 forces the ARA line to a binary ONE. Simultaneously, the SIU 100 switches the AZC line to a binary ONE signalling the module 500 to accept the R/W command (see FIG. 9).

Upon detecting the change of state in the ARA line, the processor 200 under microinstruction control completes the processing of the instruction. That is, the processor 200 waits until the data word(s) requested has been received from SIU 100 as explained herein.

Figure 8:
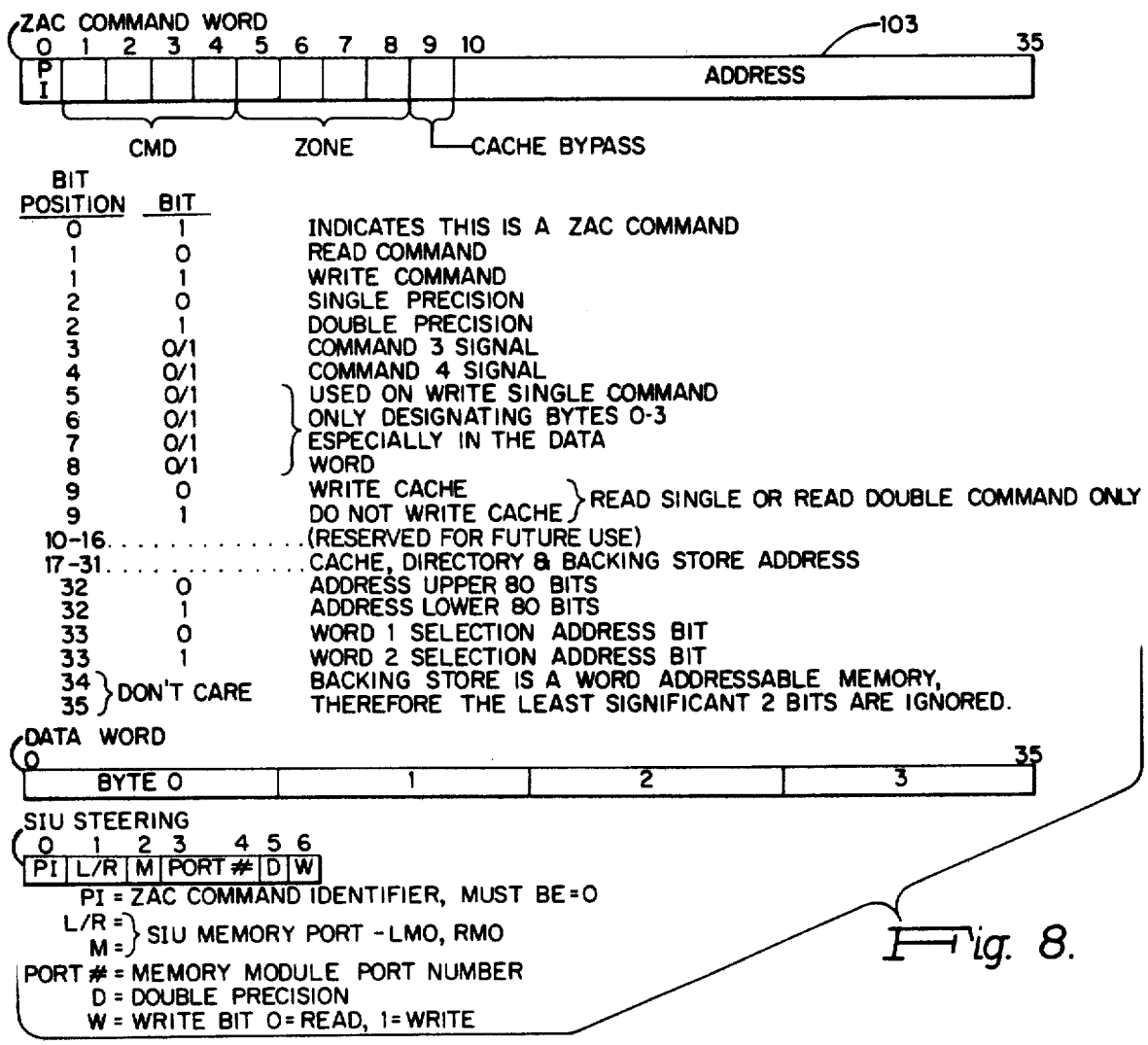
FIG. 8 shows the format of a ZAC memory command in accordance with the present invention.

Here it is assumed that the memory command is coded to specify a write single operation. Referring to FIGS. 8 and 9, it is seen that the command and address data of the ZAC command word are loaded into ZAC register 500-120 in response to signal AZC100 from the AZC line at time 1T (i.e., trailing edge when system clock pulse 1T switches from a binary ONE to a binary ZERO). The address signals from the DTM lines 17–33 stored in ZAC register 500-120 are applied as inputs to the directory storage unit 500-22 and to the directory comparison logic circuits 500-24 as shown in FIG. 6.

More specifically, the address signals applied to DTM lines 26–32 are used as a block address for addressing the directory storage unit 500-22 while the address signals applied to lines DTM 17-25 correspond to the signals to be written into directory storage unit 500-22 in the case of a directory write operation. The same address signals applied to the directory comparison circuits 500-24 are used for establishing whether the block of data already resides in cache 500-20.

It will be also noted that the address signals applied to lines DTM 17-33 are also applied to backing store 500-40 for read out of a block of data therefrom.

From FIG. 9, it is seen that a search of the directory storage unit 500-22 is immediately initiated to determine if the information requested has already been stored in cache 500-20. The search operation is performed during the interval between clock pulses 1T and 2T. In this example, it is assumed that a portion of the information requested by processor 200 resides in cache 500-20.

Referring to FIG. 6, it is seen that the circuits of block 500-6 decode bits 1–4 of the ZAC command. The zone bits 5–8 are coded to specify which bytes are to be written into memory. Since bit 1 is a binary ONE and bits 2–4 are binary ZEROS, signal WR000 is a binary ZERO. Hence, gate 500-61 forces signal RR100 to a binary ZERO and signal WR/RCL100 to a binary ONE. The signal WR/RLL100 is applied as an input to gates 500-64.

The signal LME/DE000 is normally a binary ONE in the absence of a local memory error or a directory error. Since it is assumed that the information being requested is in cache 500-20, the gate 500-280 will force signal DIRCOMP100 to a binary ONE. This in turn causes gate 500-282 to force signal SETHIT100to a binary ONE. Upon the occurrence of clocking signal CLKDIR020, a hit register flip-flop 500-284 switches to a binary ONE. Accordingly, signals HIT000 and HITREG100 correspond to a binary ZERO and a binary ONE respectively (i.e., hit detected).

The signal WR000 conditions gate 500-462 to force the backing store command signal BSCMD100 to a binary ONE. Assuming the write command is valid (i.e., correct code and format), signal TCERROR000 is a binary ONE. Accordingly, upon the occurrence of backing store timing signal SLO4T/NSLO2T100, gate 500-464 is operative to force the backing store request signal BSREQ100 to a binary ONE during the interval between timing pulses 1T and 2T (see FIG. 9). This signals the backing store 500-40 to initiate a memory cycle of operation. Additionally, signal WR000 causes gate 500-470 to force signal BSWR100 to a binary ONE. Since this is a write single command, gate 500-472 forces signal WRDBL000 to a binary ONE. Accordingly, the state of signal LME000 establishes whether gate 500-476 forces signal DISABBWR000 to a binary ZERO. Since it is assumed there were no errors, signal LME000, a binary ONE, conditions gate 500-476 to force signal DISABBSWR000 to a binary ONE. This enables the backing store write operation to take place.

In response to the backing store request, the backing store 500-40 is operative to read out a 160 bits of data into output register 500-42. The data appears in correct form at the output of the circuits 500-44 prior to the occurrence of timing pulse T7 as shown in FIG. 9.

As seen from FIG. 6, the data and check signal RD00-71111 and RDP0-P7111 read out from backing store 500-46 are applied as one set of inputs to switch 500-8. These signals are merged with the data and check signals WD00-71111 and WDPPOP7111 from register 500-12. It is the coding of the zone bit signals applied to lines DTMO5-08100 which directly select the sources of the different bytes as a function of the state of address bit 33 and the command bits. In the case of a write single command, the state of address bit 33 obtained from the ZAC register 500-12 specifies which bytes of word (WWD1 or WWD2) from backing store 500-46 are to be replaced with the word from SIU 100. When address bit A33000 is a binary ONE, the zone bit signals establish which bytes of word 1, corresponding to signals WD00-36100 and WDP0-P3100, are to replace signals RD00-36111 and RDP0-P3111 read out from backing store 500-46. However, when address bit A33000 is a binary ZERO, the zone bit signals establish which bytes of word 2, corresponding to signals WD37-711 and WDP4-P7100, are to replace signals RD37-71111 and RDP4-P7111. The data in signals, as shown in FIG. 9, are applied to SIU 100 at time 2T.

The resulting merged output signals WD00-7110 and WP0-WDP71110 from switch 500-8 are applied at time T7 as data input to cache store 500-20 and the check bit generation circuits of block 500-44. In a conventional manner, these circuits generate the required error detection and correction check bits for the new and old merged data signals. In the case of an uncorrectable error condition, the circuits generate a wire error signal which forces signal LME000 to be forced to a binary ZERO. This results in the aborting of a write cycle of operation as explained herein.

Since signal RDLOAD100 is a binary ZERO, gate 500-260 conditions gate 500-262 to force signal ENAB-DIR-WR100 to a binary ZERO. Hence, the directory write enable circuits 500-266 remain disabled. However, it will be noted from FIG. 7 that the signal WR000 causes NAND/AND gate 500-61 to force signal WR/RCL100 to a binary ONE. Since it has been assumed that there is no directory error or local memory error, signal LME/DE000 is a binary ONE. Accordingly, NAND/AND gate 500-64, upon the occurrence of backing store timing signal BS8T101 forces signal WRLOAD000 to a binary ZERO. The signal WRLOAD000 causes NAND gate to force signal WRCACHE100 to a binary ONE. Accordingly, NAND/AND gate 500-212 is operative to force signal WRCACHE100 to a binary ONE upon the occurrence of clocking signal CLK141.

As seen from FIG. 9, the cache write enable circuits 500-214 are conditioned by the write cache signal WRCACHE100 during timing pulse 8T to write the merged signals WD00-71110 and WDP0-P7110 into cache store 500-20 at the column specified by the address signals applied to lines DTM-26-31. The state of address bit 32 defines the particular column of the block into which the 80 bits are to be written. More specifically, signal LWR80100 is a binary ONE (writing lower 80 bits) which causes gate 500-218 to force signal RDLDU80000 to a binary ONE. The gate 500-222 causes address signal CAADDR32100 to assume the state address signal stored in ZAC register 500-120. That is, when address bit 32 is a binary ONE, signal CAADDR32100 is a binary ONE.

Additionally, as noted from FIG. 9, following timing pulse T9, the circuits 500-478 generate the write backing store signal in response to timing signal BSWT40100. The signals WD00-79 are written into backing store 500-46. It will be appreciated that the utilization of a single path ensures that the same data signals are written into both cache store 500-20 and backing store 500-46. Additionally, the arrangement reduces the amount of circuits required.

The local memory module 500 is operative at the completion of the write cycle of operation to force line RDTR to a binary ONE signalling the SIU 100 as status that the data previously requested to be written by a ZAC command has been accepted. When the processor 200 has removed the data following the establishment of a data path signalled by ARDA forced to a binary ONE, SIU 100 forces the RDAA line to a binary ONE. This signals the local memory module 500 that the operation is complete.

It will be appreciated that in the absence of a directory compare (i.e., no hit) wherein the information requested to be written by processor 200 does not reside in cache 500-20, signal HIT000 will be a binary ONE. At the same time, signal HITREG100 is a binary ZERO which forces signal MISS100 to a binary ONE. As seen from FIG. 7, the signal HITREG100 causes NAND-/AND gate 500-64 to force signal WRLOAD000 to a binary ONE. This inhibits the cache write enable circuits 500-214 from writing the information into cache store 500-20. However, the information is written into backing store 500-46 in the manner previously described.

It will be appreciated that a write double command also causes the data stored in cache store 500-20 to be updated by the two data words supplied by the requester. Here, both bits 1 and 2 of the command are binary ONES and zone bits are all binary ONES. From FIG. 7, it is seen that both signals DBL100 and BSWR100 are binary ONES. This causes NAND-/AND gate 500-472 to force signal WRDBL000 to a binary ZERO which in turn causes NAND gate 500-476 to force signal DISABBSWR000 to a binary ONE.

The above enables the circuits 500-478 during the write cycle of operation notwithstanding the state of error signal LME000. The reason is that the error is correctable in that the entire two words rather than a portion of a data word (i.e., 1 to 4 bytes) is being written into backing store 500-46 and cache store 500-20.

The above illustrates how the arrangement of the present invention enables automatic updating of data stored in cache store during the same interval that the same data is being updated in backing store. The stored block of information may be updated by 1 through 4 bytes or by two words depending upon the coding of the write command.

By updating data in the manner described, the arrangement of the present invention eliminates the need to require the system to perform flushing operations. Also, it is believed that the arrangement provides for improvement of the hit ratio.

It will be appreciated that many modifications may be made to the preferred embodiment of the present invention as for example, the manner in which commands are formatted and coded as well as the manner in which certain control and timing signals are generated. For the sake of simplicity, in many instances, a single source of the various signals was indicated. However, it will be appreciated that the same signals may be independently generated by other sources for reducing timing restrictions. Additionally, it will be appreciated that the teachings of the present invention may be utilized where the merging of old data with new data takes place at the output of the cache store. However, this requires the utilization of additional circuits.

While in accordance with the provisions and statutes there has been illustrated and described the best forms of the invention known, certain changes may be made to the system described without departing from the spirit of the invention as set forth in the appended claims and, in some cases, certain features of the invention may be used to advantage without a corresponding use of other features.

What is claimed is:

1. An input/output data processing system for controlling input/output operations involving data transfers between a plurality of modules and a plurality of input/output devices, said system comprising:

system interface means having a plurality of ports;

said plurality of modules connected to a different one of said plurality of ports, said modules including at least one memory module and a plurality of command modules, each of said command modules including:

command generating means for generating memory commands, a first type of memory command including an address designating the location in said memory module where data accompanying said memory command is to be stored; and, said one memory module including:

a cache store operatively connected to said one of said ports for storing blocks of information words in response to said memory commands;

a backing store operatively connected to said one of said ports for storing information words, said backing store including a plurality of word locations, each number of said plurality of word locations defining a block;

control circuit means connected to said cache store and to said backing store for controlling the operation of said cache store and backing store, said control circuit means including:

input register means connected to said one port for receiving said memory commands from said plurality of command modules;

command decode circuit means connected to said input register means for decoding each of said first type of memory commands and generating signals for initiating a memory cycle of operation simultaneously in said backing store and said cache store;

input data switching means connected to said one of said interface ports, said switching means including first input means for receiving said data accompanying said first type of memory command, second input means operatively connected to said backing store for receiving words read out during a cycle of operation in response to each said first type of command and output means coupled to said cache store and said backing store, said data switching means applying to said output means the updated data resulting from merging said data accompanying each of said first type command with said words read out from said backing store during said memory cycle of operation;

a directory store including a plurality of word locations corresponding in number to the number of blocks in said cache store, each word location for storing a block address designating where a particular block of information is stored in said cache store;

comparison means connected to said directory store and to said input register means for comparing said address of said memory command with the block address read out from said directory store in response to said memory command, said comparison means generating an output compare signal indicative of a true address comparison;

hit control means connected to said comparison means and said command decode means, said hit control means generating a hit signal in response to said output compare signal for indicating when the block of information words specified by said first type of command is stored in said cache store; and, said command decode circuit means when conditioned by said hit signal being operative in response to said each first type of memory command generating control signals for enabling said cache store to write at the same address said updated data thereby facilitating fast access to valid current information within said cache store.

2. The system of claim 1 wherein said control circuit means further includes cache write enable circuit means coupled to said command decode circuit means and to said hit control means, said cache write enable circuit means being conditioned by said command decode circuit means in response to said control signals to generate write clocking signals, said cache store in response to said write clocking signals writing said updated data into the block specified by said address of said first type of memory command during said memory cycle of operation.

3. The system of claim 1 wherein each of said first types of said memory commands is coded to further include a command portion and a zone portion, said command portion being coded to specify a write operation and said zone portion being coded to specify which portions of said input data are to be written at said address.

4. The system of claim 3 wherein said data accompanying said command includes a predetermined number of words, said command decode means further including means for applying signals to said input data switching means corresponding to said zone portion, said data switching means being conditioned by said signals to replace the portions of said words from said second input means with said data words from said first means as specified by said zone portion.

5. The system of claim 4 wherein said data switching means includes a multiposition selector switch, said first input means including a first group of input terminals connected to said one interface port, said second input means including a second group of input terminals connected to said backing store and said output means including a group of output terminals connected to said cache store and to said backing store.

6. The system of claim 5 wherein each word includes a number of bytes, said command portion being coded to specify a write single operation wherein said predetermined number of said words is one, said data switching means being conditioned by said zone signals to replace the bytes of a corresponding one of said words from said second group of input terminals with the bytes of said word applied to said first group of input terminals as specified by the coding of said zone portion.

7. The system of claim 5 wherein each word includes a number of bytes, said command portion being coded to specify a write double operation wherein said predetermined number of said words is two, said data switching means being conditioned by said zone signals to replace the portions of corresponding ones of said words with all of the bytes of each of said words applied to said first group of input terminals.

8. The system of claim 2 wherein said control circuit means further includes backing store request circuit means coupled to said command decode circuit means and to said hit control means, said request circuit means being conditioned by said command decode circuit means to generate a request signal for conditioning said backing store to perform said memory cycle of operation for read out of a block of information specified by said address.

9. The system of claim 8 wherein said control means further includes backing store write enable circuit means coupled to said command decode circuit means, said backing store write enable circuit means being conditioned by said command decode circuit means in response to each said first type of command to generate a control signal, said backing store in response to said control signal writing said updated data into the block specified by said address of said first type of memory command during said memory cycle of operation.

10. The system of claim 9 wherein said control circuit means further includes directory write enable means coupled to said command decode circuit means and to said hit control means, said write enable circuit means being conditioned by said command decode circuit means in response to said output compare signal to inhibit generation of directory write clocking signals for writing said address into said directory store.

11. The system of claim 10 wherein said hit control means comprises input gating means connected to receive said output compare signal, and bistable storage means connected to said input gating means, said input gating means being operative in response to said compare signal to switch said bistable storage means to a predetermined state for generating said hit signal.

12. An improved input/output system for sharing access to a local memory module between a plurality of command modules, each of said command modules including:

command generating means for generating memory commands, each write memory command including an address designating a location in said local memory modules where a number of data words accompanying said command are to be stored; and, said local memory module including:

a cache store section for storing blocks of information to provide fast access thereto, said cache store section including:

a cache store for storing said blocks;

a directory store including a plurality of word locations corresponding in number to the number of blocks in said cache store, each word location for storing a block address designating where a particular block of information is stored in said cache store;

comparison circuit means coupled to said directory store for comparing said address of said command received from said command generating means with a block address read out from said directory store during said memory cycle of operation, said comparison circuit means generating an output compare signal in response to an address match; and, hit register means connected to said comparison circuit means, said hit register means being operative in response to said output compare signal to store a hit signal indicative of said address match;

a backing store section for storing blocks of words in response to said memory commands during a corresponding number of backing store cycles of operation;

an input section coupled to said cache store section, said backing store section and to each of said command modules, said input section for merging said number of data words with the words read out from said backing store section during a read portion of a backing store cycle of operation for updating a block of words stored in said backing store section;

an output section coupled to said cache store section, said backing store section and to each of said command modules;

a control circuit section coupled to said input section, said output section, said cache store section and to said backing store section, said control circuit section including:

register means connected to said input section for receiving said memory commands, and to said comparison means for applying said command address for comparison with said block address; and, command decode circuit means connected to said input section for decoding said commands and generating signals for initiating simultaneously memory cycles of operation in said backing store section and said cache store section; and, said command decode circuit means when conditioned by said hit signal being operative in response to said write command to generate control signals for enabling both said cache store and said backing store to write therein said updated information words during a same memory cycle of operation.

13. The system of claim 12 wherein said control circuit section further includes cache write enable circuit means coupled to said command decode circuit means and to said hit register means, said cache write enable circuit means being conditioned by said command decode circuit means in response to said control signals to generate write clocking signals, said cache store in response to said write clocking signals writing the merged data words into the block specified by said address of said write memory command during said backing store cycle of operation.

14. The system of claim 12 wherein each write memory command is coded to further include a command field and a zone field, said command field being coded to specify one of a number of write operations and said zone field being coded to specify which portions of said number of data words are to be written at said address.

15. The system of claim 14 wherein said input section includes input data selector means having first input means coupled to receive said number of data words from said plurality of command modules, second input means coupled to receive said words from said backing store section and output means for applying the merged data words to said cache store and said backing store section, said command decode means including means for applying signals to said input data selector means corresponding to said zone field, said data selector means being conditioned by said signals to replace the portions of said data words from said second input means with said data words from said first means specified by said zone field.

16. The system of claim 15 wherein said data selector means includes a multiposition selector switch, said first input means including a first group of input terminals operatively coupled to said command modules, said second input means including a second group of input terminals to said backing store section and said output means including a group of output terminals connected to said cache store and said backing store section.

17. The system of claim 16 wherein each data word includes a number of bytes, said command field being coded to specify a write single operation wherein said number of said words is one, said data selector means being conditioned by said zone field signals to replace the bytes of a corresponding one of said words from said second input terminals with the bytes of said word applied to said first group of input terminals as specified by the coding of said zone field.

18. The system of claim 16 wherein each word includes a number of bytes, said command field being coded to specify a write double operation wherein said number of said words is two, said data selector means being conditioned by said zone field signals to replace the bytes of corresponding ones of said words read out from said backing store section with all of the bytes of each of said words applied to said first group of input terminals.

19. The system of claim 12 wherein said control circuit section further includes backing store write enable circuit means coupled to said command decode circuit means, said backing store write enable circuit means being conditioned by said command decode circuit means in response to each write command to generate a control signal, said backing store in response to said control signal writing said updated block at said address specified by said write command during a write portion of said backing store cycle of operation concurrent with the writing of said updated block in said cache store.

20. A memory unit comprising:
a backing store for storing information words, said backing store including a plurality of word locations, each number of said plurality of word locations defining a block of word locations;
a cache store for storing blocks of information words, said cache store having a plurality of word locations, each said number of said plurality of word locations defining a block of word locations;
a directory store including a plurality of word locations corresponding in number to the number of blocks in said cache store, each word location for storing a block address designating where a particular block of information is stored in said cache store;
control means operatively connected to said cache store and to said backing store, said control means for controlling the operation of said cache store and said backing store, said control means including:
input register means connected to receive memory commands from any one of a plurality of command modules connected in common to said memory unit, each write memory command being coded to include an address specifying which block of said word locations is to be referenced during a memory cycle of operation for writing therein a number of new data words accompanying said write command; and,
command decode circuit means connected to said input register means for decoding said memory commands, said decode circuit means in response to each write command being operative to generate control signals for selectively enabling said backing store and said cache store during a memory cycle of operation for writing said new words specified by said write command;
input data selector means including:
first input means for receiving said new data words accompanying said command;
second input means coupled to said backing store for receiving the words of a block read out during a read portion of said memory cycle of operation; and,
output means coupled to said cache store and said backing store for applying an updated version of said block resulting from merging said new data words with said words of said block read out from said backing store;
comparison means connected to said directory store and to said input register means for comparing said address of said memory command with the block address read out from said directory store in response to said each write memory command and for generating an output compare signal in response to a true address comparison; and,
hit register means for storing a hit signal in response to said output compare signal for indicating when the block information words specified to be updated by said write command are stored in said cache store; and,
said command decode circuit means when conditioned by said hit signal being operative in response to each write command from any one of said plurality of command modules to generate control signals for enabling said cache store and said backing store to write simultaneously at the same address said updated block during said memory cycle of operation.

21. The system of claim 20 wherein said control circuit means further includes cache write enable circuit means coupled to said command decode circuit means and to said hit register means, said cache write enable circuit means being conditioned by said command decode circuit means in response to said control signals to generate write clocking signals, said cache store in response to said write clocking signals writing said updated block at said address specified by said write memory command during said memory cycle of operation.

22. The system of claim 20 wherein each write command is coded to further include a command field and a zone field, said command field being coded to specify a write operation and said zone field being coded to specify which portions of said new data words are to be written at said address.

23. The system of claim 22 wherein said command decode means includes means for applying signals to said input data selector means corresponding to said zone field, said data selector means being conditioned by said signals to replace the portions of said words from said second input means with said new data words from said first means specified by said zone field.

24. The system of claim 23 wherein said data selector means includes a multiposition selector switch, said first input means including a first group of input terminals connected to receive said new data words, said second input means including a second group of input terminals connected to receive said words read out from said backing store and said output means including a group of output terminals connected to said cache store and said backing store.

25. The system of claim 24 wherein each data word includes a number of bytes, said command field being coded to specify a write single operation wherein said predetermined number of said words is one, said data selector means being conditioned by said zone field signals to replace the bytes of a corresponding one of said words from said second input terminals with the bytes of said word applied to said first group of input terminals as specified by the coding of said zone field.

26. The system of claim 24 wherein each word includes a number of bytes, said command field being coded to specify a write double operation wherein said predetermined number of said words is two, said data selector means being conditioned by said zone field signals to replace the bytes of corresponding ones of said words with all of the bytes of each of said new words applied to said first group of input terminals.

27. The system of claim 20 wherein said control means further includes backing store write enable circuit means coupled to said command decode circuit means, said backing store write enable circuit means being conditioned by said command decode circuit means in response to each write command to generate a control signal, said backing store in response to said control signal writing said updated block data at the address specified by said write command during a write portion of said memory cycle of operation.

* * * * *